US011512216B2

(12) United States Patent
Sugihara et al.

(10) Patent No.: US 11,512,216 B2
(45) Date of Patent: Nov. 29, 2022

(54) PRETREATMENT LIQUID AND INK SET

(71) Applicants: TOYO INK SC HOLDINGS CO., LTD., Tokyo (JP); TOYOCOLOR CO., LTD., Tokyo (JP)

(72) Inventors: Masahiro Sugihara, Tokyo (JP); Yuki Sasaki, Tokyo (JP); Toshihiro Tetsuka, Tokyo (JP); Takaaki Koike, Tokyo (JP); Akiko Imazato, Tokyo (JP); Naoya Kikuta, Tokyo (JP); Tomoe Tanabe, Tokyo (JP)

(73) Assignees: TOYO INK SC HOLDINGS CO., LTD., Tokyo (JP); TOYOCOLOR CO., LTD., Tokyo (JP)

( * ) Notice: Subject to any disclaimer, the term of this patent is extended or adjusted under 35 U.S.C. 154(b) by 509 days.

(21) Appl. No.: 16/322,110

(22) PCT Filed: Sep. 28, 2018

(86) PCT No.: PCT/JP2018/036516
§ 371 (c)(1),
(2) Date: Jan. 31, 2019

(87) PCT Pub. No.: WO2019/130704
PCT Pub. Date: Jul. 4, 2019

(65) Prior Publication Data
US 2021/0130639 A1  May 6, 2021

(30) Foreign Application Priority Data

Dec. 25, 2017 (JP) .............................. JP2017-248112

(51) Int. Cl.
| | | |
|---|---|---|
| *C09D 11/54* | (2014.01) | |
| *C09D 123/30* | (2006.01) | |
| *B41M 5/00* | (2006.01) | |
| *B41M 5/50* | (2006.01) | |
| *C09D 11/322* | (2014.01) | |

(52) U.S. Cl.
CPC ......... *C09D 123/30* (2013.01); *B41M 5/0017* (2013.01); *B41M 5/502* (2013.01); *C09D 11/322* (2013.01); *C09D 11/54* (2013.01)

(58) Field of Classification Search
CPC .... C09D 123/30; C09D 11/322; C09D 11/54; B41M 5/0017; B41M 5/502; B41M 5/5218; B41M 5/5227; B41M 5/52; B41M 5/00; B41J 2/01
USPC ...................................................... 523/160
See application file for complete search history.

(56) References Cited

U.S. PATENT DOCUMENTS

| | | | |
|---|---|---|---|
| 6,605,337 B1 | 8/2003 | Mori et al. | |
| 11,359,107 B2 * | 6/2022 | Okamoto | ............. C09D 11/107 |
| 2005/0106118 A1 * | 5/2005 | Sakuma | .................. C11D 11/04 |
| | | | 424/70.24 |
| 2011/0001779 A1 | 1/2011 | Kida | |
| 2012/0268521 A1 | 10/2012 | Moribe et al. | |
| 2012/0308786 A1 | 12/2012 | Shioda et al. | |
| 2014/0098158 A1 | 4/2014 | Mukai et al. | |
| 2015/0274992 A1 | 10/2015 | Aoyama et al. | |
| 2015/0352836 A1 | 12/2015 | Kanasugi et al. | |
| 2015/0352877 A1 | 12/2015 | Niu et al. | |
| 2016/0312061 A1 | 10/2016 | Aoai | |
| 2017/0164609 A1 * | 6/2017 | Shibata | ................ C09D 183/02 |
| 2017/0355868 A1 | 12/2017 | Saiga et al. | |
| 2017/0368861 A1 | 12/2017 | Niu et al. | |
| 2018/0056691 A1 | 3/2018 | Arai et al. | |
| 2019/0390074 A1 | 12/2019 | Kunii et al. | |
| 2020/0157370 A1 * | 5/2020 | Okamoto | ............... C09D 11/54 |
| 2020/0172754 A1 * | 6/2020 | Okamoto | ............. C09D 11/322 |

FOREIGN PATENT DOCUMENTS

| | | |
|---|---|---|
| CN | 102070744 | 5/2011 |
| CN | 102549087 | 7/2012 |
| JP | 2000238422 | 9/2000 |
| JP | 2000335084 | 12/2000 |
| JP | 2003326829 | 11/2003 |
| JP | 2005074655 | 3/2005 |
| JP | 2006281568 | 10/2006 |
| JP | 2012233161 | 11/2012 |
| JP | 2013213210 | 10/2013 |
| JP | 2015186879 | 10/2015 |
| JP | 2016013688 | 1/2016 |
| JP | 2016168782 | 9/2016 |
| JP | 2016204524 | 12/2016 |
| JP | 2017061124 | 3/2017 |
| JP | 2017088646 | 5/2017 |
| JP | 2017165965 | 9/2017 |
| JP | 2017190374 | 10/2017 |
| JP | 2017222833 | 12/2017 |
| JP | 2018012829 | 1/2018 |
| JP | 2018035270 | 3/2018 |
| JP | 6307195 | 4/2018 |
| WO | 2009110263 | 9/2009 |
| WO | 2016118161 | 7/2016 |
| WO | 2018043414 | 3/2018 |
| WO | 2018066474 | 4/2018 |

OTHER PUBLICATIONS

"Search Report of Europe Counterpart Application", dated Feb. 12, 2021, pp. 1-6.
"Office Action of China Counterpart Application", dated Mar. 15, 2021, with English translation thereof, p. 1-p. 13.

* cited by examiner

*Primary Examiner* — Hannah J Pak
(74) *Attorney, Agent, or Firm* — JCIPRNET

(57) ABSTRACT

A pretreatment liquid that is used together with an aqueous inkjet ink containing a pigment and water, wherein the pretreatment liquid contains resin microparticles (A), a surfactant (B), a coagulant (C) and water, the surfactant (B) contains a polyoxyalkylene alkyl ether (b-1), and the coagulant (C) contains a polyvalent metal salt and/or a cationic polymer compound and has a water absorptivity at a temperature of 40° C. and a relative humidity of 80% of 75% by mass or less.

5 Claims, No Drawings

PRETREATMENT LIQUID AND INK SET

CROSS-REFERENCE TO RELATED APPLICATION

This application is a 371 of international application of PCT application serial no. PCT/JP2018/036516, filed on Sep. 28, 2018, which claims the priority benefit of Japan application no. 2017-248112, filed on Dec. 25, 2017. The entirety of each of the above—mentioned patent applications is hereby incorporated by reference herein and made a part of this specification.

TECHNICAL FIELD

The present invention relates to a pretreatment liquid and an ink set containing the pretreatment liquid.

BACKGROUND ART

Unlike conventional plate-based printing such as offset printing and gravure printing, digital printing does not require a reproduction film or a printing plate. As a result, digital printing can achieve cost reductions, and can be applied to the printing of small lots of various different items.

In the inkjet printing method, which represents one type of digital printing, ink droplets are discharged from extremely fine nozzles directly onto a printing substrate, and the ink droplets are adhered to the substrate to obtain text or images. The inkjet printing method offers the advantages that noise from the printing apparatus that is used is minor, operability is excellent, and color production is simple, and therefore inkjet printing has become widely used in output devices in offices and households. Furthermore, as a result of improvements in inkjet technology, inkjet printing is also starting to be used for digital printing output devices in industrial applications.

Conventionally, the inks used in inkjet printing methods for industrial applications are solvent inkjet inks and UV inkjet inks. However, in recent years, in order to meet environmental requirements, the demand for aqueous inkjet inks is growing.

Aqueous inks used in inkjet printing methods (hereafter also described as simply "for inkjets") are conventionally used on plain paper or specialty papers (such as photographic glossy paper). In other words, the liquid component in the ink contains water as the main component, and also contains a water-soluble organic solvent such as glycerol or a glycol, which is added in order to control the wetting of the substrate and the drying properties. When a pattern of text or images is printed onto a substrate using an inkjet aqueous ink (hereafter also referred to as an "aqueous inkjet ink", an "aqueous ink", or simply an "ink") containing these liquid components, the liquid components permeate into the substrate and dry, enabling the ink components to be fixed to the substrate.

On the other hand, the substrates for inkjets not only include the aforementioned plain paper and specialty papers, and other substrates of high permeability such as high-quality papers and recycled papers, but also include low-permeability substrates such as coated papers, art papers and finely coated papers, as well as impermeable substrates such as film substrates. Up until now, aqueous inkjet inks have been used to form images of practically usable image quality on high permeability substrates and low-permeability substrates. However, on impermeable substrates such as film substrates, the liquid ink droplets undergo absolutely no penetration into the substrate following impact. Accordingly, the drying caused by the liquid components in the ink penetrating into the substrate does not occur, and bleeding of the ink droplets tends to occur, resulting in a deterioration in the image quality.

Further, with impermeable substrates, because the ink undergoes absolutely no penetration into the substrate, achieving satisfactory adhesion is difficult. If the adhesion to the impermeable substrate is unsatisfactory, then various problems arise, including detachment of the printed layer (ink film) as a result of rubbing or the like, meaning the targeted image quality cannot be obtained, and a phenomenon in which the ink film is transferred to the rear surface of another substrate when printed items are stacked for storage (the blocking phenomenon).

Known countermeasures for managing this deterioration in image quality include treating the impermeable substrate using a pretreatment liquid. Pretreatment liquids for aqueous inkjet inks are generally one of two types: those that form a layer (ink receiving layer) that absorbs the liquid components within the aqueous inkjet ink and improves the drying properties (see Patent Documents 1 and 2), and those that form a layer (ink aggregation layer) that intentionally causes aggregation of the solid components and an increase in the ink viscosity, thereby preventing bleeding between liquid droplets of the aqueous inkjet ink and preventing color irregularities, resulting in an improvement in the image quality (see Patent Documents 3 and 4).

However, in the case of an ink-receiving layer, if the layer receives a large amount of ink at once, then image cracking caused by swelling of the ink-receiving layer, bleeding and color irregularities caused by exceeding the amount of ink able to be received by the ink-receiving layer, and deterioration in the print density as a result of absorption of the ink components into the receiving layer can sometimes occur.

Further, when an ink-receiving layer is formed, the coating thickness of the pretreatment liquid must be greater than in the case of an ink aggregation layer described below. When the coating amount is large, the drying properties of the pretreatment liquid itself deteriorate, and problems caused by unsatisfactory drying may sometimes occur. As described above, when a pretreatment liquid is used on an impermeable substrate such as a film substrate, it is thought that because the pretreatment liquid undergoes absolutely no penetration into the substrate, the types of problems mentioned above are more likely to occur.

On the other hand, in one example of a pretreatment liquid for forming an ink aggregation layer, Patent Document 3 discloses a pretreatment liquid containing a polyvalent metal salt and (cationized) hydroxyethyl cellulose, and having a prescribed surface tension. Further, this document discloses that by using this pretreatment liquid, high-quality printed items having high image density, no bleeding and excellent abrasion resistance can be obtained. However, in the above document, the only substrates on which the pretreatment liquid was actually used were low-permeability coated papers, and no mention is made of use of the pretreatment liquid on impermeable substrates such as films. When the inventors of the present invention performed evaluations using a polyolefin film and a nylon film as substrates, the adhesion to these films was unsatisfactory.

Further, pretreatment liquids are also used for ensuring favorable adhesion to impermeable substrates. For example, Patent Document 4 discloses a pretreatment liquid (printing undercoat liquid) containing a cyclic ester compound having a specific structure and a thermoplastic resin. Further, the document also discloses that by using this pretreatment liquid which has superior adhesion to plastic films, printed items having excellent abrasion resistance, scratch resistance and water resistance can be obtained. However, the above pretreatment liquid improves the adhesion by using the cyclic ester compound to dissolve and swell the substrate. Accordingly, the adhesion to films such as polyolefin films and nylon films which exhibit superior fastness to the above solvent tends to be inadequate.

Furthermore, pretreatment liquids that use a binder resin such as a polyurethane resin, polyolefin resin or polyester resin to provide an adhesive function are also known. However, based on investigations by the inventors of the present invention, it was discovered that a pretreatment liquid which combined the above binder resin with a coagulant described below in order to achieve a combination of favorable adhesion and superior image quality suffered from a marked deterioration in storage stability, and in addition, the adhesion and image quality were actually inferior to those obtained when only the component described above was used.

In order to address the above problems, a printing method could be considered in which a liquid composition containing a binder resin and a liquid composition containing a coagulant are prepared separately, with the two liquids being mixed together immediately prior to application to the substrate. However, in such a printing method, printing cannot be performed over a long period of time, and the workability is extremely poor, meaning the method is not suited to practical application.

As described above, no pretreatment liquid currently exists that exhibits excellent adhesion to impermeable substrates such as film substrates, superior blocking resistance and excellent drying properties, is able to form printed items having excellent image quality with no mixed color bleeding or color irregularities, and also exhibits excellent storage stability over long periods.

PRIOR ART DOCUMENTS

Patent Documents

Patent Document 1: JP 2000-238422 A
Patent Document 2: JP 2000-335084 A
Patent Document 3: JP 2005-074655 A
Patent Document 4: JP 2006-281568 A

SUMMARY OF THE INVENTION

Problems to be Solved by the Invention

In light of the above circumstances, embodiments of the present invention provide a pretreatment liquid that exhibits excellent adhesion to impermeable substrates such as film substrates, superior blocking resistance and excellent drying properties, is able to form printed items having excellent image quality with no mixed color bleeding or color irregularities, and also exhibits excellent storage stability over long periods. Further, an ink set which contains the above pretreatment liquid and an aqueous inkjet ink, and is capable of favorably realizing the above properties is also provided.

Means to Solve the Problems

In other words, the present invention relates to the embodiments described below. However, the present invention is not limited to the following embodiments.

One embodiment relates to a pretreatment liquid that is used together with an aqueous inkjet ink containing a pigment and water, wherein the pretreatment liquid contains resin microparticles (A), a surfactant (B), a coagulant (C) and water, the surfactant (B) contains a polyoxyalkylene alkyl ether (b-1) represented by a general formula (1) shown below, the coagulant (C) contains a polyvalent metal salt and/or a cationic polymer compound, and the coagulant (C) has a water absorptivity at a relative humidity of 80% of 75% by mass or less.

$$R\text{—}O\text{-}(EO)_m\text{-}(PO)_n\text{—}H \qquad \text{General formula (1)}$$

In general formula (1), R represents an alkyl group of 8 to 22 carbon atoms, an alkenyl group of 8 to 22 carbon atoms, an alkylcarbonyl group of 8 to 22 carbon atoms, or an alkenylcarbonyl group of 8 to 22 carbon atoms.

EO represents an ethylene oxide group and PO represents a propylene oxide group.

Further, m represents the average number of added moles of EO, and is a number from 8 to 100, and n represents the average number of added moles of PO, and is a number from 0 to 99, provided that m>n.

When n is not 0, there are no restrictions on the addition sequence of the $(EO)_m$ and $(PO)_n$, and the addition may be in blocks or may be random.

One embodiment relates to the above pretreatment liquid, wherein the blend amount of the polyoxyalkylene alkyl ether (b-1) is from 5 to 50% by mass relative to the blend amount of the resin microparticles (A).

One embodiment relates to the above pretreatment liquid, wherein the coagulant (C) contains a divalent metal salt.

One embodiment relates to the above pretreatment liquid, wherein the resin microparticles (A) contain two or more types of resin microparticles selected from the group consisting of polyurethane resins, polyurethane polyurea resins, (meth)acrylic resins, acrylic-modified polyurethane resins, and polyolefin resins.

One embodiment relates to the above pretreatment liquid, which is used on a thermoplastic resin substrate.

Another embodiment relates to an ink set containing the pretreatment liquid of an embodiment described above, and an aqueous inkjet ink containing a pigment, a water-soluble organic solvent and water.

Further, yet another embodiment relates to a substrate to which a pretreatment liquid has been applied, having a layer formed from the pretreatment liquid of one of the embodiments described above on an impermeable substrate.

Yet another embodiment relates to a printed item obtained by printing the aqueous inkjet ink described above to a substrate to which the pretreatment liquid described above has been applied.

The disclosure of the present invention is related to the subject matter disclosed in prior Japanese Application 2017-248112 filed on Dec. 25, 2017, the entire content of which is incorporated by reference herein.

Effects of the Invention

The present invention can provide a pretreatment liquid that exhibits excellent adhesion to impermeable substrates such as film substrates, superior blocking resistance and excellent drying properties, is able to form printed items having excellent image quality with no mixed color bleeding or color irregularities, and also exhibits excellent storage stability over long periods. Further, the present invention can also provide an ink set which contains the pretreatment liquid and an aqueous inkjet ink, and is capable of favorably realizing the above properties.

EMBODIMENTS FOR CARRYING OUT THE INVENTION

Embodiments of the present invention (hereafter sometimes referred to as simply "embodiments") are described below in further detail. However, the present invention is not limited by the following description, and may include all manner of embodiments.

1. Pretreatment Liquid

One embodiment relates to a pretreatment liquid. As mentioned above, conventionally, in order to impart favorable adhesion to impermeable substrates, pretreatment liquids containing a coagulant and a binder resin selected from among polyurethane resins, polyolefin resins and polyester resins have typically been used. However, these types of pretreatment liquids not only have markedly inferior storage stability, but when used in combination with aqueous inkjet inks, also exhibit inferior adhesion of the printed items and poor image quality. As a result of intensive research to ascertain the cause of these problems, the inventors of the present invention discovered that the above deterioration in image quality was due to interactions between the anionic groups that exist in the binder resin and the cationic components within the coagulant.

The binder resin ensures favorable adhesion to impermeable substrates as a result of hydrogen bonding and intermolecular interactions between the anionic groups and functional groups that exist on the impermeable substrate. On the other hand, in order to improve the image quality of printed items, the coagulant composed of a polyvalent metal salt or cationic polymer compound that has been used in conventional pretreatment liquids adopts an ionic state within the pretreatment liquid. The cationic components within the pretreatment liquid interact with the solid components in the aqueous inkjet ink, causing an increase in the viscosity of the ink droplets and aggregation of the above solid components, thereby suppressing mixed color bleeding and color irregularities on the impermeable substrate and improving the image quality.

When a binder resin and a coagulant are used together, it is thought that the anionic groups in the binder resin cause an interaction with the cationic components of the coagulant, resulting in the formation of insoluble salts. As a result, it is thought that not only is favorable storage stability unachievable for the pretreatment liquid, but hydrogen bond formation between the binder resin and the impermeable substrate is also impaired, causing a deterioration in the adhesion. Moreover, it is also thought that as a result of the loss in cationic components that act upon the aqueous inkjet ink, the image quality also deteriorates.

In contrast, as a result of continued intensive investigation of pretreatment liquids, the inventors of the present invention discovered that by using the resin microparticles (A) as the binder resin, specifying the level of water absorptivity of the coagulant (C), and also using the polyoxyalkylene alkyl ether (b-1) represented by general formula (1), a pretreatment liquid could be obtained that exhibits excellent adhesion to impermeable substrates, superior blocking resistance and excellent drying properties, is able to form printed items having excellent image quality with no mixed color bleeding or color irregularities, and also exhibits excellent storage stability over long periods. Although details of the mechanism by which the pretreatment liquid of the above composition is able to favorably address the problems described above remain unclear, the inventors of the present invention postulate the following.

First, the binder resin used in the pretreatment liquid of the present embodiment exists in the form of resin microparticles. Binder resins generally exist in one of two forms, either a water-soluble resin or resin (micro) particles, and the form may be selected appropriately in accordance with the characteristics required for the pretreatment liquid and printed items. In the pretreatment liquid of the present embodiment, resin microparticles are used as the binder resin. Resin microparticles adsorb more strongly to the polyoxyalkylene alkyl ether (b-1) described below. Further, because the resin microparticles have particulate properties, the blocking resistance of the printed items improves. For these types of reasons, resin microparticles are a favorable material for use as the binder resin. Further, compared with the case where a water-soluble resin is used, the use of resin microparticles enables a larger amount of resin to be added to the ink, meaning resin microparticles are also preferred in terms of enhancing the durability of the printed items such as the abrasion resistance and the water resistance.

Further, the coagulant (C) contained in the pretreatment liquid of the present embodiment contains a polyvalent metal salt and/or cationic polymer compound that has a water absorptivity at a temperature of 40° C. and a relative humidity of 80% that is 75% by mass or less. As mentioned above, the polyvalent metal salt or cationic polymer compound that functions as the coagulant (C) exists in the form of ions within the pretreatment liquid. Generally, the easier a compound ionizes in liquid, the higher the dissociation constant (also called the "ionization constant" when the coagulant (C) is a polyvalent metal salt) becomes. Further, compounds having a higher dissociation constant or ionization constant tend to have higher solubility in water or a higher water absorptivity.

However, if the water absorptivity of the coagulant (C) is too high, then the coagulant absorbs moisture from the air, resulting in a deterioration in the adhesion, blocking resistance and drying properties. Further, there is also a possibility that when an impermeable substrate to which the pretreatment liquid has been applied is stored for a long period, absorption of moisture may cause a deterioration in the image quality. In contrast, in the embodiment of the present invention, by specifying the water absorptivity of the coagulant (C) in the manner described above, the type of image deterioration mentioned above is suppressed. Further, it is thought that suppressing excessive ionization in the pretreatment liquid also contributes to an improvement in the storage stability of the pretreatment liquid.

Moreover, the pretreatment liquid of the present embodiment contains the polyoxyalkylene alkyl ether (b-1) represented by general formula (1) as the surfactant (B). It is thought that the hydrocarbon group of this polyoxyalkylene alkyl ether (b-1) orients with the binder resin having anionic groups, and the alkylene oxide groups exhibit a steric repulsion effect, thereby improving the chemical stability of the binder resin, suppressing interaction with the cationic component of the coagulant, and inhibiting the formation of insoluble salts.

Particularly in those cases where a polyvalent metal salt is used as the coagulant, it is thought that because the polyvalent metal cations are attracted to the Stern layer of the binder resin, thereby neutralizing much of the interface charge, the steric repulsion effect of the polyoxyalkylene alkyl ether (b-1) is able to function more effectively.

As described above, by employing the composition described above, a pretreatment liquid can be obtained that exhibits excellent adhesion to impermeable substrates, superior blocking resistance and excellent drying properties, is able to form printed items having excellent image quality with no mixed color bleeding or color irregularities, and also exhibits excellent storage stability over long periods.

Next, each of the components that constitute the pretreatment liquid of the present embodiment are described below in further detail.

<Resin Microparticles (A)>

The pretreatment liquid of an embodiment of the present invention contains the resin microparticles (A) as a binder resin. In the present description, the term "resin microparticles" means particles having a particle size measured by the method described below of 5 to 1,000 nm. In the present description, particles having a particle size greater than 1,000 nm are called "resin particles", thereby distinguishing them from resin microparticles.

There are no particular limitations on the type of resin microparticles (A) that can be used in the pretreatment liquid. For example, from the viewpoint of the adhesion to impermeable substrates, polyurethane resins, polyurea resins, polyurethane urea resins, (meth)acrylic resins, acrylic-modified polyurethane resins, styrene-(meth)acrylic resins, styrene-maleic acid (anhydride) resins, rosin-modified maleic acid resins, polyolefin resins, polyester resins, polyether resins, and polycarbonate resins and the like are preferred.

Polyurethane resins, polyurethane polyurea resins, (meth)acrylic resins, acrylic-modified polyurethane resins and polyolefin resins are more preferred, and polyolefin resins are particularly desirable.

In the present description, the term "(meth)acrylic" means acrylic and/or methacrylic, and the term "maleic acid (anhydride)" means maleic acid and/or maleic anhydride.

One or more olefins selected from the group consisting of ethylene, propylene and butene can be used favorably as the olefin that constitutes the above polyolefin resin. It is particularly desirable that the olefin includes at least propylene.

Examples of the polyolefin resin include unmodified polyolefin resins, halogenated polyolefin resins, modified polyolefin resins, and modified halogenated polyolefin resins. The pretreatment liquid of the present embodiment may use any of these resins.

Among these resins, from the viewpoint of obtaining a pretreatment liquid that does not cause dehydrohalogenation reactions and can be stored stably for long periods of time, an unmodified polyolefin resin and/or modified polyolefin resin is preferably selected. From the viewpoint of obtaining printed items having excellent adhesion, selection of a modified polyolefin resin is particularly preferred. Examples of the modification within the modified polyolefin resin include acid modification, acrylic modification, urethane modification and epoxy modification, and any of these forms of modification can be used favorably.

The pretreatment liquid may use only one type of the resin microparticles (A) listed above, or may contain a combination of two or more types. In one embodiment, the pretreatment liquid preferably contains two or more types of resin microparticles selected from the group consisting of polyurethane resins, polyurethane polyurea resins, (meth)acrylic resins, acrylic-modified polyurethane resins, and polyolefin resins. By using a combination of resin microparticles having different properties and types, a combination of superior adhesion, blocking resistance and drying properties for the printed items, and favorable storage stability for the pretreatment liquid can be achieved. Among the various possibilities, from the viewpoint of achieving a favorable combination of the above properties, a combination of two or more types of the above polyolefin resin microparticles is particularly desirable as the resin microparticles (A).

The resin microparticles (A) may be synthesized using conventional synthesis methods, or a commercially available product may be used. In those cases where a commercially available product is selected, examples of products that may be used favorably include the ADEKA BONTIGHTER HUX series (manufactured by ADEKA Corporation); the UREARNO series (manufactured by Arakawa Chemical Industries, Ltd.), the PARASOL series (manufactured by Ohara Paragium Chemical Co., Ltd.), the UCOAT series and PERMARIN series (both manufactured by Sanyo Chemical Industries, Ltd.), the SUPERFLEX series and SUPERFLEX E series (both manufactured by DKS Co., Ltd.), the WBR series (manufactured by Taisei Fine Chemical Co., Ltd.), the HYDRAN series (manufactured by DIC Corporation), the HITEC series (manufactured by Toho Chemical Industry Co., Ltd.), the SUPERCHLON series and AUROREN series (both manufactured by Nippon Paper Industries Co., Ltd.), the Nichigo-Polyester series (manufactured by The Nippon Synthetic Chemical Industry Co., Ltd.), the AQUACER series and Hordamer series (both manufactured by BYK-Chemie GmbH), the TAKELAC series (manufactured by Mitsui Chemicals, Inc.), the PASCOL series (manufactured by Meisei Chemical Works, Ltd.), and the ARROWBASE series (manufactured by Unitika Ltd.).

In one embodiment, a polyolefin resin can be used favorably as the resin microparticles (A). Examples of commercially available products that may be used include HITEC E-4A, E-1000, E-5403P, E-6400, E-6500, E-8237, E-9015, S-3121, S-3800, S-8512, S-9200 and S-9242 (all manufactured by Toho Chemical Industry Co., Ltd.), SUPERCHLON E-415, E-480T and E-604, and AUROREN AE-202 and AE-301 (all manufactured by Nippon Paper Industries Co., Ltd.), AQUACER 497, 498, 507, 526, 531, 537, 539, 552 and 1547, and Hordamer PE02, PE03, PE34 and PE35 (all manufactured by BYK-Chemie GmbH), and ARROWBASE SA-1200, SB-1200, SB-1230N, SD-1200 and SE-1200 (all manufactured by Unitika Ltd.).

The amount of the resin microparticles (A) contained in the pretreatment liquid, expressed as a solid fraction amount relative to the total mass of the pretreatment liquid, is preferably from 1 to 40% by mass, more preferably from 1 to 30% by mass, and particularly preferably from 3 to 20% by mass. By ensuring the blend amount of the resin microparticles (A) falls within the above range, the storage stability of the pretreatment liquid is more favorable, and printed items having excellent adhesion to impermeable substrates and excellent image quality can be obtained.

<Melting Point of Resin Microparticles (A)>

The melting point of the resin microparticles (A) is preferably from 0 to 130° C., more preferably from 15 to 105° C., and particularly preferably from 30 to 90° C. Provided the melting point is at least 0° C., the storage stability of the pretreatment liquid is favorable, whereas provided the melting point is not higher than 130° C., excellent adhesion to impermeable substrates can be achieved.

The above melting point represents the value measured using a differential scanning calorimetry (DSC), and for example, can be measured using the following procedure. First, a dried solid sample of the resin of about 2 mg is weighed into an aluminum sample container, and the aluminum sample container is then placed in the holder of a DSC measurement device (for example, a DSC-60 Plus manufactured by Shimadzu Corporation). Measurement is then performed under conditions including a rate of temperature increase of 10° C./minute, and the temperature of the heat absorption peak read from the obtained DSC chart represents the melting point used in the present description. Indium is used for temperature calibration.

<Glass Transition Temperature of Resin Microparticles (A)>

From the viewpoint of obtaining printed items having excellent adhesion to impermeable substrates, the glass transition temperature (Tg) of the resin microparticles (A) is preferably from −50 to 130° C., and more preferably from 0 to 130° C. Moreover, from the viewpoint of also enabling an improvement in the pretreatment liquid storage stability, the above glass transition temperature is particularly preferably from 50 to 130° C. In a similar manner to the melting point, the glass transition temperature can also be measured by differential scanning calorimetry (DSC). Specifically, in the DSC chart obtained using the method described above, the point of intersection of the low-temperature side baseline and the tangent at the inflection point of that baseline is determined, and the temperature at that point of intersection is deemed the glass transition temperature.

<Particle Size of Resin Microparticles (A)>

In one embodiment, the particle size (D50) of the resin microparticles (A) used in the pretreatment liquid is preferably from 30 to 500 nm, more preferably from 40 to 400 nm, and particularly preferably from 50 to 300 nm. Provided the particle size is at least 30 nm, the storage stability of the pretreatment liquid is favorable. On the other hand, provided the particle size is not more than 500 nm, printed items having excellent adhesion to impermeable substrates can be obtained. The particle size (D50) is the particle size at 50% (the median size) in a volume-based cumulative distribution measured by the dynamic light scattering method using a particle size distribution analyzer (for example, a Microtrac UPA-EX150 manufactured by MicrotracBEL Corporation).

<Surfactant (B)>

The surfactant (B) used in the pretreatment liquid of an embodiment of the present invention contains a polyoxyalkylene alkyl ether (b-1) represented by the above general formula (1).

In general formula (1), the portion represented by R functions as a hydrophobic group. It is thought that provided the carbon number of R is at least 8, the portion represented by R will orient preferentially with the surface of the resin microparticles (A). On the other hand, provided the carbon number of R is not more than 22, the solubility of the surfactant (B) in water is enhanced, and the orientation of the surfactant (B) with the surface of the resin microparticles (A) is faster. As a result, the storage stability of the pretreatment liquid improves. The above R group may be branched or linear. From the viewpoint of the strength of the orientation with the surface of the resin microparticles (A), R is preferably linear.

More specifically, R is preferably a group selected from the group consisting of alkyl groups of 8 to 22 carbon atoms, alkenyl groups of 8 to 22 carbon atoms, alkylcarbonyl groups of 8 to 22 carbon atoms, and alkenylcarbonyl groups of 8 to 22 carbon atoms. The selection of this type of R group is particularly preferred from the viewpoints of improved structural similarity and better interactions such as van der Waals forces between the portion represented by R and the resin microparticles (A). For example, in those cases where the resin microparticles (A) are at least one type of resin selected from the group consisting of rosin-modified maleic acid resins, polyolefin resins, styrene-maleic acid resins, styrene-(meth)acrylic resins, polyurethane resins and polycarbonate resins, R is preferably an alkyl group or an alkenyl group. Further in other examples, when the resin microparticles (A) are at least one type of resin selected from the group consisting of polyurethane resins, polyurea resins, polyurethane polyurea resins, (meth)acrylic resins, styrene-(meth)acrylic resins, acrylic-modified polyurethane resins, polyester resins and polyether resins, R is preferably an alkylcarbonyl group or an alkenylcarbonyl group.

In one embodiment, from the viewpoint of realizing the effects described above even more favorably, R is preferably a group of 10 to 18 carbon atoms. Further, R is preferably an alkyl group or an alkenyl group, and an alkyl group is particularly desirable.

In the above general formula (1), the average number of added moles of the ethylene oxide group (m in general formula (1)) is from 8 to 100, and the average number of added moles of the propylene oxide group (n in general formula (1)) is from 0 to 99, provided that m>n.

As mentioned above, in general formula (1), it is thought that the alkylene oxide groups function as hydrophilic groups and generate a steric repulsion effect. In order to ensure this effect is realized favorably, it is preferable that the average number of added moles of the ethylene oxide group, which is more strongly hydrophilic than the propylene oxide group, is at least 8, and that the average number of added moles of the propylene oxide group, which has a high steric repulsion effect but weaker hydrophilicity, is less than the average number of added moles of the ethylene oxide group.

Further, by ensuring that the average number of added moles of the ethylene oxide group is not more than 100 and the average number of added moles of the propylene oxide group is not more than 99, the storage stability can be improved while maintaining good adhesion to impermeable substrates.

In one embodiment, from the viewpoint of realizing the effects described above even more favorably, m is preferably from 15 to 50. Further, an m value of 30 to 50 is particularly desirable. Moreover, from the viewpoint of obtaining printed items having excellent adhesion, the value of m+n is preferably from 15 to 55, and particularly preferably from 30 to 50.

From the viewpoint of realizing the effects described above even more favorably, in one embodiment, the pretreatment liquid contains the polyoxyalkylene alkyl ether (b-1) in an amount that is preferably from 5 to 50% by mass, and more preferably from 5 to 35% by mass, relative to the blend amount of the resin microparticles (A). By ensuring that this amount is at least 5% by mass, the storage stability of the pretreatment liquid is more favorable. Moreover, the wetting properties of the pretreatment liquid relative to impermeable substrates improve and a more uniform ink aggregation layer can be formed, meaning the image quality of the aqueous inkjet ink also improves. Further, by ensuring the above amount is not more than 50% by mass, printed items having excellent adhesion to impermeable substrates can be obtained.

The polyoxyalkylene alkyl ether (b-1) may be synthesized using known synthesis methods, or a commercially available product may be used. In those cases where a commercially available product is selected, examples of products that may be used include the Newcol series (manufactured by Nippon Nyukazai Co., Ltd.), the EMULGEN series (manufactured by Kao Corporation), the LEOX series (manufactured by Lion Specialty Chemicals Co., Ltd.), the EMALEX series (manufactured by Nihon Emulsion Co., Ltd.); the NONION series and the PERSOFT series (both manufactured by NOF Corporation); and the PEGNOL series (manufactured by Toho Chemical Industry Co., Ltd.).

<HLB Value of Polyoxyalkylene Alkyl Ether (b-1)>

The HLB (Hydrophilic-Lipophilic Balance) value for the polyoxyalkylene alkyl ether (b-1) is preferably from 10 to 19. The HLB value is more preferably from 12 to 19, and particularly preferably from 14 to 19. The HLB value represents the hydrophilic and lipophilic properties of a material as a numerical value, wherein a smaller HLB value indicates higher lipophilicity. In the present description, the HLB value is calculated using the calculation formula of the Griffin method represented by formula (2) shown below.

HLB value=20×(sum of the formula weights of hydrophilic portions)÷(molecular weight of material)   Formula (2)

Provided the HLB value is at least 10, the solubility in water is high, and the steric repulsion effect of the hydrophilic groups strengthens, meaning the storage stability of the pretreatment liquid becomes favorable. Provided the HLB value is not higher than 19, the wetting properties of the pretreatment liquid relative to impermeable substrates improve, and printed items having excellent adhesion and image quality can be obtained.

In the pretreatment liquid, a combination of the polyoxyalkylene alkyl ether (b-1) described above and another surfactant may be used as the surfactant (B), provided the performance is not impaired. Examples of other surfactants that may be used in combination with the polyoxyalkylene alkyl ether (b-1) include siloxane-based surfactants, fluorine-based surfactants, acetylene glycol-based surfactants and acrylic-based surfactants.

In one embodiment, the blend amount of the polyoxyalkylene alkyl ether (b-1) in the surfactant (B) is preferably at least 15% by mass based on the total mass of the surfactant (B). This blend amount is more preferably at least 35% by mass, and even more preferably 55% by mass or greater. In one embodiment, the blend amount of the polyoxyalkylene alkyl ether (b-1) in the surfactant (B) may be 100% by mass.

<Coagulant (C)>

The pretreatment liquid of an embodiment of the present invention contains a coagulant (C) having a specific water absorptivity. In the present description, the term "coagulant" means a component included in an aqueous inkjet ink that can break down the dispersive state of the pigment and resin microparticles and cause aggregation of the ink components, and/or can insolubilize the water-soluble resin and increase the viscosity of the aqueous inkjet ink.

In the present embodiment, from the viewpoint of enabling a marked improvement in the image quality, the coagulant (C) used in the pretreatment liquid that is combined with an aqueous inkjet ink preferably contains a polyvalent metal salt and/or a cationic polymer compound. Polyvalent metal salts and cationic polymer compounds exhibit strong functionality as coagulants and are effective in aggregating and precipitating pigments even when added in small amounts, and can therefore suppress the occurrence of mixed color bleeding and color irregularities, leading to a dramatic improvement in image quality. Further, these materials function rapidly as coagulants, and do not impair the manifestation of the functions of the resin microparticles (A), and are therefore thought to also improve the adhesion to impermeable substrates. In the pretreatment liquid of the present embodiment, either one of a polyvalent metal salt and a cationic polymer compound may be used, or a combination of the two may be used.

The coagulant (C) used in the pretreatment liquid has a water absorptivity at a temperature of 40° C. and a relative humidity of 80% that is 75% by mass or less. In the present description, the "water absorptivity" refers specifically to a value measured using the method described below.

First, the coagulant is stored for 24 hours in an environment at a temperature of 100° C. and a relative humidity of not more than 75%. At this time, in the case of coagulants such as some commercially available products that can only be obtained in the form of an aqueous solution, the water is first removed by volatilization, before the coagulant is stored in the environment at a temperature of 100° C. and a relative humidity of not more than 75%.

Following storage in an environment at a temperature of 100° C. and a relative humidity of not more than 75% in the manner described above, the mass of the coagulant is measured (W1 (g)), and the coagulant is then stored for 24 hours in an environment at a temperature of 40° C. and a relative humidity of 80%.

Following storage in this environment at a temperature of 40° C. and a relative humidity of 80%, the mass is remeasured (W2 (g)), and the water absorptivity is calculated using formula (3) shown below.

Water absorptivity (% by mass)=100×{(W2−W1)/W1}   Formula (3)

As described above, in the present embodiment, by ensuring that the water absorptivity of the coagulant (C) used in the pretreatment liquid is 75% by mass or less, printed items can be obtained that have excellent adhesion and image quality, and are able to retain those properties for long periods of time. Further, from the viewpoint of realizing the effects described above even more favorably, the water absorptivity mentioned above is more preferably 40% by mass or less.

<Polyvalent Metal Salt>

In those cases where a polyvalent metal salt is selected as the coagulant (C), any material that exhibits functionality as the above coagulant and has favorable solubility and diffusibility may be used. A single polyvalent metal salt may be used alone, or a combination of two or more polyvalent metal salts may be used.

The "polyvalent metal salt" described above means a metal salt composed of a divalent or higher metal ion and a counter anion. Among the various possibilities, the polyvalent metal salt is preferably a divalent metal salt containing a divalent metal ion. Divalent metal salts exhibit excellent solubility and diffusibility in water. Accordingly, when the metal salt contacts a liquid droplet of an aqueous inkjet ink, mixing occurs rapidly, and the liquid droplet quickly undergoes aggregation and an increase in viscosity, thereby suppressing wet spreading of the liquid droplet across the impermeable substrate, and yielding a printed item of excellent image quality.

Moreover, in terms of having superior functionality as a coagulant, the divalent ion that constitutes the above divalent metal salt is preferably one type of ion selected from the group consisting of a calcium ion, magnesium ion, zinc ion and iron ion. In particular, the calcium ion offers the advantage of having a large ionization tendency and dissociating readily, and therefore exhibits superior effects as a coagulant. Further, the calcium ion has a small ionic radius, and moves easily through the pretreatment liquid and the ink droplets. Accordingly, the calcium ion can be used particularly favorably as the divalent metal ion.

Further, the counter anion for the above polyvalent metal ion is preferably at least one anion selected from the group consisting of a chloride ion, bromide ion, nitrate ion, nitrite ion, sulfate ion, carbonate ion, pantothenate ion, propionate ion, ascorbate ion, acetate ion and lactate ion. Among these, from the viewpoints of the solubility in water, and the interactions with the components within the aqueous inkjet ink, an acetate ion and/or a lactate ion is particularly preferred.

In one embodiment, specific examples of the above polyvalent metal salt include calcium lactate, calcium ascorbate, calcium acetate, magnesium acetate, calcium chloride, aluminum sulfate, and aluminum nitrate. Among these, the use of one or more salts selected from the group consisting of calcium lactate, calcium ascorbate and calcium acetate is preferred.

In one embodiment, the amount of the polyvalent metal salt in the pretreatment liquid, expressed as an amount of the polyvalent metal ion relative to the total mass of the pretreatment liquid, is preferably from 0.5 to 8% by mass. This amount, expressed as an amount of the polyvalent metal ion, is more preferably from 1 to 6.5% by mass, and particularly preferably from 1.5 to 5% by mass. By ensuring that the amount of the polyvalent metal ion falls within the above range, favorable wetting properties for the pretreatment liquid relative to the substrate can be ensured, while mixed color bleeding and color irregularities are suppressed, meaning printed items of particularly superior image quality can be obtained. Further, the phenomenon wherein the polyvalent metal salt causes an increase in boiling point does not manifest excessively, meaning favorable drying properties can also be achieved. The amount of the polyvalent metal ion relative to the total mass of the pretreatment liquid is determined using formula (4) shown below.

$$\text{(Amount of polyvalent metal ion) (\% by mass)} = WC \times MM \div MC \quad \text{Formula (4)}$$

In formula (4), WC represents the amount (% by mass) of the polyvalent metal salt relative to the total mass of the pretreatment liquid, MM represents the molecular weight of the polyvalent metal ion that constitutes the polyvalent metal salt, and MC represents the molecular weight of the polyvalent metal salt.

<Cationic Polymer Compound>

In one embodiment, the pretreatment liquid contains a cationic polymer compound as the coagulant (C). In those cases where a cationic polymer compound is used, then in the same manner as that described for the polyvalent metal salt, any cationic polymer compound that exhibits functionality as the above coagulant and has favorable solubility and diffusibility may be used. A single cationic polymer compound may be used alone, or a combination of two or more such cationic polymer compounds may be used.

The cationic polymer compound is a compound that has a cationic group within the molecule, and is formed by linking one or more monomers via covalent bonds. Examples of the cationic group contained in the cationic polymer compound include, but are not limited to, an amino group, ammonium group, amide group and —$NHCONH_2$ group.

In the preparation of the cationic polymer compound, examples of materials that may be used for introducing the cationic group include amine compounds such as vinylamine, allylamine, methyldiallylamine and ethyleneimine; amide compounds such as acrylamide, vinylformamide and vinylacetamide; cyanamide compounds such as dicyandiamide; epihalohydrin compounds such as epifluorohydrin, epichlorohydrin, methylepichlorohydrin, epibromohydrin and epiiodohydrin; cyclic vinyl compounds such as vinylpyrrolidone, vinylcaprolactam and vinylimidazole; amidine compounds; pyridinium salt compounds; and imidazolium salt compounds.

In those cases where a cationic polymer compound having a water absorptivity of 75% by mass or less is used as the coagulant (C) in the pretreatment liquid, the cationic polymer compound preferably contains at least one structural unit selected from among diallylamine structural units, diallylammonium structural units and epihalohydrin structural units.

In one embodiment, the cationic polymer compound more preferably contains at least a diallylammonium structural unit. Resins that contain such structural units are all strong electrolytes, exhibit favorable dissolution stability within the pretreatment liquid, and also exhibit superior functionality as coagulants.

Among the various cationic polymer compounds, resins containing a diallylammonium structural unit are preferred, as they exhibit particularly superior aggregation properties, and enable printed items having little mixed color bleeding or color irregularities and excellent color development on impermeable substrates to be obtained with ease. In terms of ease of availability and the like, the hydrochloride salts or ethyl sulfate salts of diallyldimethylammonium and/or diallylmethylethylammonium ions may be selected particularly favorably.

On the other hand, although the reasons are unclear, when a resin containing an epihalohydrin structural unit is used, excellent water resistance is obtained for the printed items. Accordingly, in one embodiment, a resin containing an epihalohydrin structural unit may also be selected favorably. Examples of resins containing an epihalohydrin structural unit include epihalohydrin-modified polyamine resins, epihalohydrin-modified polyamide resins, epihalohydrin-modified polyamide polyamine resins, and epihalohydrin-amine copolymers. In terms of ease of availability and the like, epichlorohydrin or methylepichlorohydrin is preferably selected as the epihalohydrin.

The cationic polymer compound described above may be a synthetic product produced using known synthesis methods, or a commercially available product may be used.

Specific examples of commercially available products of resins containing a diallylamine structural unit include PAS-21CL, PAS-21, PAS-M-1L, PAS-M-1 and PAS-M-1A (manufactured by Nittobo Medical Co., Ltd.); and Unisense KCA100L and KCA101L (manufactured by Senka Corporation).

Further, examples of commercially available products of resins containing a diallylammonium structural unit include PAS-H-1L, PAS-H-SL, PAS-24, PAS-J-81L, PAS-J-81 and PAS-J-41 (manufactured by Nittobo Medical Co., Ltd.); and Unisense FPA1000L, FPA1001L, FPA1002L, FCA1000L, FCA1001L and FCA5000L (manufactured by Senka Corporation).

Moreover, examples of commercially available products of resins containing both a diallylamine structural unit and a diallylammonium structural unit include PAS-880 (manufactured by Nittobo Medical Co., Ltd.).

On the other hand, specific examples of commercially available products containing an epihalohydrin structural unit include Catiomaster PD-1, 7, 30, A, PDT-2, PE-10, PE-30, DT-EH, EPA-SK01 and TMHMDA-E (manufactured by Yokkaichi Chemical Co., Ltd.).

The weight average molecular weight of cationic polymer compounds that may be used in the pretreatment liquid is preferably from 5,000 to 50,000, and is more preferably from 10,000 to 30,000. The weight average molecular weight of the cationic polymer compound may be measured using normal methods. Specifically, the weight average molecular weight can be determined as a polystyrene-equivalent value, using a TSKgel column (manufactured by Tosoh Corporation) and a GPC measurement apparatus (HLC-8120GPC, manufactured by Tosoh Corporation) fitted with an RI detector, and using THF as the eluent. Values obtained in this manner are used as the weight average molecular weight values in the present description.

The blend amount of the cationic polymer compound in the pretreatment liquid, expressed as a solid fraction relative to the total mass of the pretreatment liquid, is preferably from 1 to 20% by mass, and more preferably from 3 to 10% by mass. By ensuring that the blend amount of the cationic polymer compound falls within this range, the viscosity of the pretreatment liquid can be adjusted to a value within the preferred range, and a pretreatment liquid having excellent storage stability can be obtained.

<Water>

In one embodiment, the amount of water contained in the pretreatment liquid, relative to the total mass of the pretreatment liquid, is preferably from 30 to 95% by mass, more preferably from 40 to 90% by mass, and even more preferably from 50 to 85% by mass. Water enhances the mutual solubility of the various materials in the pretreatment liquid, such as the resin microparticles (A), the surfactant (B) and the coagulant (C), and can improve the storage stability of the pretreatment liquid.

<Organic Solvent>

In one embodiment, the pretreatment liquid may also contain an organic solvent. By also using an organic solvent, the solubility of the surfactant (B) and the coagulant (C), as well as the drying properties and wetting properties of the pretreatment liquid can be adjusted favorably. In the pretreatment liquid, a single organic solvent may be used alone, or a combination of two or more organic solvents may be used.

Although there are no particular limitations on the types of organic solvents that can be used in the pretreatment liquid, use of a water-soluble organic solvent is preferred. In the present description, a "water-soluble organic solvent" means an organic solvent that is liquid at 25° C. and has a solubility of at least 1% by mass in 25° C. water.

When the pretreatment liquid contains an organic solvent, from the viewpoints of achieving superior compatibility with the surfactant (B) and the coagulant (C), and improving the storage stability of the pretreatment liquid, use of a water-soluble organic solvent containing at least one hydroxyl group within the molecular structure is preferred. Among such compounds, the use of the monohydric alcohols and/or dihydric alcohols (glycols) listed below as the water-soluble organic solvent is particularly desirable.

Further, in one embodiment, a water-soluble organic solvent having a boiling point at one atmosphere of 75 to 210° C. is preferably used as the above water-soluble organic solvent containing at least one hydroxyl group within the molecular structure. A pretreatment liquid containing this type of water-soluble organic solvent can be applied uniformly to impermeable substrates and yields further improvement in the adhesion and image quality, and is therefore particularly desirable.

From the viewpoint of ensuring the above effect is realized favorably, the boiling point at one atmosphere of the above water-soluble organic solvent containing at least one hydroxyl group within the molecular structure is more preferably from 75 to 200° C. The boiling point of this water-soluble organic solvent is even more preferably from 75 to 180° C., and most preferably from 80 to 180° C. In the present description, the boiling point at one atmosphere refers to a value measured by conventional methods such as a differential thermal analysis (DTA) method or a DSC method.

In one embodiment, specific examples of water-soluble organic solvents containing at least one hydroxyl group within the molecular structure that can be used favorably in the pretreatment liquid include:

monohydric alcohols such as methanol, ethanol, 1-propanol, 2-propanol, 1-butanol and 2-butanol;

dihydric alcohols (glycols) such as 1,2-ethanediol (ethylene glycol), 1,2-propanediol, 1,3-propanediol, 1,2-butanediol, 1,3-butanediol, 1,4-butanediol, 1,2-pentanediol, 1,5-pentanediol, 1,2-hexanediol, 1,6-hexanediol, 1,2-heptanediol, 2,2-dimethyl-1,3-propanediol, 2-methyl-1,3-propanediol, 2-ethyl-2-methyl-1,3-propanediol, 3-methyl-1,3-butanediol, 3-methyl-1,5-pentanediol, 2-methyl-2-propyl-1,3-propanediol, 2-methylpentan-2,4-diol, 2-ethyl-1,3-hexanediol, 1,2-octanediol, diethylene glycol, triethylene glycol, tetraethylene glycol, polyethylene glycol #200, polyethylene glycol #400, dipropylene glycol, tripropylene glycol and dibutylene glycol;

glycol monoalkyl ethers such as ethylene glycol monoethyl ether, ethylene glycol monobutyl ether, diethylene glycol monomethyl ether, diethylene glycol monoethyl ether, diethylene glycol monopropyl ether, diethylene glycol monobutyl ether, diethylene glycol monopentyl ether, diethylene glycol monohexyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol monobutyl ether, dipropylene glycol monopropyl ether, tripropylene glycol monomethyl ether, tripropylene glycol monoethyl ether, 1,2-butylene glycol monomethyl ether and 1,3-butylene glycol monomethyl ether; and cyclic polyol compounds such as glycerol, trimethylolpropane, 1,2,4-butanetriol, 1,2,6-hexanetriol, diglycerol and polyglycerol.

As mentioned above, among the water-soluble organic solvents listed above, solvents having a boiling point at one atmosphere of 75 to 210° C. may be selected favorably, solvents having a boiling point of 75 to 200° C. may be selected more favorably, solvents having a boiling point of 75 to 180° C. may be selected even more favorably, and solvents having a boiling point of 80 to 180° C. are the most desirable.

In one embodiment, examples of preferred water-soluble organic solvents include ethanol, 1-propanol, 2-propanol, 1-butanol, 2-butanol, 1,2-ethanediol, 1,2-propanediol, 1,2-butanediol, ethylene glycol monobutyl ether, diethylene glycol monomethyl ether, diethylene glycol monoethyl ether, 1,2-butylene glycol monomethyl ether and 1,3-butylene glycol monomethyl ether. Among these, the use of ethanol, 1-propanol, 2-propanol, 1,2-propanediol, 1,2-butanediol, or 1,3-butylene glycol monomethyl ether is particularly preferred.

Furthermore, in one embodiment, the pretreatment liquid may contain an organic solvent other than those listed above. Specific examples of other solvents that may be used include:

glycol dialkyl ethers such as diethylene glycol dimethyl ether, diethylene glycol methyl ethyl ether, diethylene glycol butyl methyl ether, diethylene glycol diethyl ether, triethylene glycol dimethyl ether, triethylene glycol methyl ethyl ether, triethylene glycol butyl methyl ether, triethylene glycol diethyl ether, tetraethylene glycol dimethyl ether, tetraethylene glycol methyl ethyl ether, tetraethylene glycol butyl methyl ether and tetraethylene glycol diethyl ether;

nitrogen-containing solvents such as 2-pyrrolidone, N-methylpyrrolidone, M-ethylpyrrolidone, ε-caprolactam, 3-methyl-2-oxazolidinone, 3-ethyl-2-oxazolidinone, N,N-dimethyl-β-methoxypropionamide, N,N-dimethyl-β-ethoxypropionamide, N,N-dimethyl-β-butoxypropionamide, N,N-dimethyl-β-pentoxypropionamide, N,N-dimethyl-β-hexoxypropionamide, N,N-dimethyl-β-heptoxypropionamide, N,N-dimethyl-β-2-ethylhexoxypropionamide, N,N-dimethyl-β-octoxypropionamide, N,N-diethyl-β-butoxypropionamide, N,N-diethyl-β-pentoxypropionamide, N,N-diethyl-β-hexoxypropionamide, N,N-diethyl-β-heptoxypropionamide and N,N-diethyl-β-octoxypropionamide; and heterocyclic compounds such as γ-butyrolactone, γ-valerolactone, δ-valerolactone, and ε-caprolactone.

In one embodiment, the total blend amount of all the organic solvents contained in the pretreatment liquid, relative to the total mass of the pretreatment liquid, is preferably from 1 to 50% by mass, more preferably from 2 to 40% by mass, and particularly preferably from 3 to 30% by mass. By ensuring that the blend amount of organic solvents falls within the above range, a pretreatment liquid can be obtained that exhibits favorable solubility of the surfactant (B) and the coagulant (C), and favorable wetting properties relative to impermeable substrates. In addition, regardless of the printing method used with the pretreatment liquid, stable printing with no printing defects can be performed over long periods of time.

In those cases where a water-soluble organic solvent containing at least one hydroxyl group is used as an organic solvent, the blend amount of that organic solvent, relative to the total mass of the entire organic solvent, is preferably from 35 to 100% by mass, more preferably from 50 to 100% by mass, and particularly preferably from 65 to 100% by mass. By adjusting the blend amount to a value within this range, the effects obtained by including the water-soluble organic solvent containing at least one hydroxyl group can be more easily obtained.

In one embodiment, the amount of organic solvent having a boiling point at one atmosphere of 240° C. or higher within the pretreatment liquid is preferably less than 10% by mass of the total mass of the pretreatment liquid (and may be 0% by mass). By ensuring that the pretreatment liquid either contains no organic solvents having a boiling point of 240° C. or higher, or if such solvents exist, contains an amount that falls within the above range, printed items having excellent image quality can be more easily obtained, and satisfactory drying properties can be obtained for the pretreatment liquid.

Moreover, in addition to ensuring that the amount of organic solvents having a boiling point at one atmosphere of 240° C. or higher is less than 10% by mass of the total mass of the pretreatment liquid, for similar reasons to those described above, the amount of organic solvents having a boiling point at one atmosphere of 220° C. or higher, relative to the total mass of the pretreatment liquid, is preferably less than 15% by mass, more preferably less than 10% by mass, and particularly preferably less than 5% by mass (and may be 0% by mass).

<pH Adjuster>

In one embodiment, the pretreatment liquid may contain a pH adjuster. By using a pH adjuster, damage to the member used in the coating apparatus can be suppressed. In addition, variation in the pH over time can be suppressed, meaning the performance of the pretreatment liquid can be maintained for long periods, and the storage stability can be maintained and improved. There are no particular limitations on the materials that can be used as the pH adjuster, and a single material may be used alone, or a combination of two or more materials may be used.

Specifically, in those cases where the pretreatment liquid needs to be made more basic, examples of materials that may be used as the pH adjuster include:

alkanolamines such as dimethylethanolamine, diethanolamine, triethanolamine and N-methyldiethanolamine;

ammonia water;

alkali metal hydroxides such as lithium hydroxide, sodium hydroxide and potassium hydroxide; and alkali metal carbonates such as lithium carbonate, sodium carbonate, sodium hydrogen carbonate and potassium carbonate.

Further, in those cases where the pretreatment liquid needs to be made more acidic, examples of materials that may be used as the pH adjuster include hydrochloric acid, sulfuric acid, acetic acid, citric acid, maleic acid, maleic anhydride, succinic acid, tartaric acid, malic acid, phosphoric acid, boric acid, fumaric acid, malonic acid, ascorbic acid and glutamic acid.

One of the above pH adjusters may be used alone, or a combination of two or more pH adjusters may be used.

The blend amount of the pH adjuster, relative to the total mass of the pretreatment liquid, is preferably from 0.01 to 5% by mass, and more preferably from 0.1 to 4.5% by mass. By adjusting the blend amount of the pH adjuster to a value within the above range, pH variation caused by external stimuli such as the dissolution of atmospheric carbon dioxide can be suppressed, whereas any inhibition of the effects of the resin microparticles (A), the surfactant (B) and the coagulant (C) can also be suppressed.

<Colorant>

In one embodiment, the pretreatment liquid preferably contains substantially no colorants such as pigments or dyes. By using a substantially transparent pretreatment liquid that contains no colorants, a printed item that retains the characteristic color or transparency of the substrate can be obtained. In the present description, the expression "contains substantially no ~" means that those cases where the material is intentionally added in an amount that impairs the effects of the embodiment of the present invention are excluded. For example, those cases where unintended impurities and/or by-products are included in the pretreatment liquid are not excluded. Specifically, the expression refers to those cases where the amount of the material in question, relative to the total mass of the pretreatment liquid, is not more than 2.0% by mass, preferably not more than 1.0% by mass, even more preferably not more than 0.5% by mass, and particularly preferably 0.1% by mass or less.

On the other hand, in another embodiment, the pretreatment liquid preferably contains a white pigment as the colorant. By using a white pretreatment liquid on colored and/or transparent substrates, printed items having excellent clarity and legibility can be obtained. In those cases where the pretreatment liquid contains a white pigment, any conventionally known material may be used as the white pigment. Specific examples of materials that can be used include inorganic oxides such as titanium oxide, zinc oxide and zirconium oxide; water-insoluble inorganic salts such as strontium titanate and barium sulfate; and water-dispersible resin (micro) particles such as hollow resin particles and nonhollow resin particles.

<Other Materials>

In one embodiment, in order to achieve certain desired physical properties, the pretreatment liquid may, if necessary, include additives such as antifoaming agents, thickeners, and preservatives and the like. When these additives are used, the blend amount relative to the total mass of the pretreatment liquid is preferably from 0.01 to 5% by mass, and more preferably from 0.01 to 3% by mass. If an additive is added in an excessive amount, there is a possibility that the functions of the surfactant (B) and the coagulant (C) within the pretreatment liquid may be impaired. Accordingly, the amount added of any additives is preferably kept within the above range.

Further, in one embodiment, the pretreatment liquid preferably contains substantially no polymerizable monomers.

<Physical Properties of Pretreatment Liquid>

In one embodiment, the amount of water-insoluble particles having an average particle size (D50) greater than 1 µm in the pretreatment liquid is preferably not more than 1% by mass relative to the total mass of the pretreatment liquid. By limiting the blend amount of water-insoluble particles having an average particle size greater than 1 µm, the storage stability of the pretreatment liquid can be maintained at a favorable level over a long period of time. Further, movement of the resin microparticles (A) within the pretreatment liquid is not impaired, meaning the adhesion also improves. The average particle size of the water-insoluble particles can be measured using the same method as that described above for the average particle size of the resin microparticles (A).

In the present description, the term "water-insoluble" means a solubility of less than 1% by mass in 25° C. water. Specific examples of water-insoluble particles having an average particle size greater than 1 µm include organic pigments, inorganic oxides, water-insoluble inorganic salts and resin particles that satisfy the above particle size condition. Even materials described above for the coagulant (C) and the like may correspond with the above water-insoluble particles if the average particle size is greater than 1 µm.

In one embodiment, the viscosity of the pretreatment liquid at 25° C. is preferably from 5 to 200 mPa·s, more preferably from 5 to 180 mPa·s, even more preferably from 10 to 160 mPa·s, and particularly preferably from 15 to 140 mPa·s. A pretreatment liquid that satisfies the above viscosity range can be applied uniformly to a substrate, and therefore a printed item having excellent image quality and adhesion can be more easily obtained. The viscosity of the pretreatment liquid can be measured in accordance with the viscosity of the treatment liquid, for example using either an E-type viscometer (TVE25L viscometer, manufactured by Toki Sangyo Co., Ltd.) or a B-type viscometer (TVB10 viscometer, manufactured by Toki Sangyo Co., Ltd.).

In one embodiment, from the viewpoint of achieving favorable wetting properties on impermeable substrates, thereby enabling formation of a uniform pretreatment liquid layer and obtaining printed items of excellent image quality, the static surface tension of the pretreatment liquid is preferably from 20 to 45 mN/m, more preferably from 22 to 40 mN/m, and particularly preferably from 25 to 35 mN/m. In the present description, the static surface tension represents the value measured at 25° C. based on the Wilhelmy method (plate method, vertical plate method). This static surface tension can be measured, for example, using an automatic surface tension meter CBVP-Z (manufactured by Kyowa Interface Science Co., Ltd.) and a platinum plate.

<Method for Producing Pretreatment Liquid>

The pretreatment liquid of an embodiment of the present invention is produced by combining the resin microparticles (A), the surfactant (B) and the coagulant (C), and if required an organic solvent, a pH adjuster and any of the additive components selected from among those described above, performing stirring and mixing, and then filtering the resulting mixture if required. However, the method for producing the pretreatment liquid is not limited to this method. For example, in the case where a pretreatment liquid that uses a white pigment as a colorant is produced, a white pigment dispersion containing the white pigment and water may be prepared in advance and subsequently mixed with the resin microparticles (A), the surfactant (B) and the coagulant (C).

In the production of the pretreatment liquid, during the stirring and mixing, the mixture described above may be heated at a temperature within a range from 40 to 100° C. is required. However, the heating is preferably performed at a temperature no higher than the minimum film-forming temperature (MFT) of the resin microparticles (A).

2. Ink Set

The pretreatment liquid according to an embodiment of the present invention may be used in the form of an ink set, by combining the pretreatment liquid with at least one aqueous inkjet ink (hereafter also referred to as an "aqueous ink" or simply an "ink"). The structural elements of the aqueous inkjet ink that constitutes the ink set of an embodiment of the present invention (hereafter also simply referred to as the "aqueous inkjet ink (aqueous ink, ink) of the present embodiment") are described below.

<Pigment>

In one embodiment, from the viewpoints of achieving excellent properties such as blocking resistance, water resistance, light resistance, weather resistance and gas resistance, the aqueous inkjet ink preferably contains a pigment as a colorant. A known organic pigment or inorganic pigment may be used as the pigment.

In one embodiment, in the case of an aqueous ink other than the white ink described below, the pigment is preferably included in an amount within a range from 2 to 20% by mass, more preferably from 2.5 to 15% by mass, and particularly preferably from 3 to 10% by mass, relative to the total mass of the aqueous ink.

In another embodiment, in the case of a white ink, the amount of the pigment relative to the total mass of the white ink is preferably from 3 to 40% by mass, more preferably from 5 to 35% by mass, and particularly preferably from 7 to 30% by mass.

Bu ensuring that the amount of the pigment in the ink is at least 2% by mass (or at least 3% by mass in the case of a white ink), printed items having satisfactory levels of color development and clarity can be obtained. Further, by ensuring that the amount of the pigment is not more than 20% by mass (or not more than 40% by mass in the case of a white ink), the viscosity of the aqueous ink can be easily adjusted to a value within a range suitable for inkjet printing. In addition, the storage stability of the aqueous ink improves, and as a result, favorable discharge stability can be maintained over a long period of time.

Examples of cyan organic pigments that can be used in the aqueous ink of an embodiment of the present invention include C.I. Pigment Blue 1, 2, 3, 15:3, 15:4, 15:6, 16, 22, 60, 64 and 66. Of these, in terms of offering superior color development and light resistance, the use of one or more pigments selected from the group consisting of C.I. Pigment Blue 15:3 and 15:4 is preferred.

Further, examples of magenta organic pigments that can be used include C.I. Pigment Red 5, 7, 12, 22, 23, 31, 48 (Ca), 48 (Mn), 49, 52, 53, 57 (Ca), 57:1, 112, 122, 146, 147, 150, 185, 202, 209, 238, 242, 254, 255, 266, 269 and 282, and C.I. Pigment Violet 19, 23, 29, 30, 37, 40, 43 and 50. Among these, in terms of offering superior color development and light resistance, the use of one or more pigments selected from the group consisting of C.I. Pigment Red 122, 150, 166, 185, 202, 209, 266, 269 and 282, and C.I. Pigment Violet 19 is preferred.

In one embodiment, from the viewpoint of further enhancing the color development properties, the use of a solid solution pigment containing a quinacridone pigment as the magenta pigment is also preferred. Examples include a solid solution pigment containing C.I. Pigment Red 122 and C.I. Pigment Violet 19, a solid solution pigment containing C.I. Pigment Red 202 and C.I. Pigment Violet 19, a solid solution pigment containing C.I. Pigment Red 209 and C.I. Pigment Violet 19, a solid solution pigment containing C.I. Pigment Red 282 and C.I. Pigment Violet 19, a solid solution pigment containing C.I. Pigment Red 122 and C.I. Pigment Red 150, a solid solution pigment containing C.I. Pigment Red 122 and C.I. Pigment Red 185, and a solid solution pigment containing C.I. Pigment Red 122 and C.I. Pigment Red 269.

Further, examples of yellow organic pigments that can be used include C.I. Pigment Yellow 12, 13, 14, 17, 20, 24, 74, 83, 86, 93, 94, 95, 109, 110, 117, 120, 125, 128, 137, 138, 139, 147, 148, 150, 151, 154, 155, 166, 168, 180, 185 and 213. Among these, in terms of offering superior color development, the use of one or more pigments selected from the group consisting of C.I. Pigment Yellow 12, 13, 14, 74, 120, 180, 185 and 213 is preferred.

Furthermore, examples of black organic pigments that can be used include aniline black, Lumogen black and azomethine azo black. Further, a plurality of color pigments selected from among the cyan pigments, magenta pigments and yellow pigments described above, and the orange pigments, green pigments and brown pigments described below may also be mixed together to form a black pigment.

In one embodiment, special colors such as orange pigments, green pigments and brown pigments may also be used in the aqueous inkjet ink. Specific examples include C.I. Pigment Orange 16, 36, 43, 51, 55, 59, 61, 64 and 71, C.I. Pigment Green 7, 36, 43 and 58, and Pigment Brown 23, 25 and 26.

There are no particular limitations on the types of inorganic pigments that can be used in the aqueous inkjet ink. For example, carbon blacks and iron oxide may be used as black pigments, and titanium oxide may be used as a white pigment.

In one embodiment, examples of carbon blacks that can be used in the aqueous ink include furnace black, channel black and acetylene black. Among these, carbon blacks having properties including a primary particle size of 11 to 50 nm, a specific surface area measured by the BET method of 50 to 400 $m^2/g$, a volatile fraction of 0.5 to 10% by mass, and a pH of 2 to 10 are preferred.

Examples of commercially available products having these types of properties include:

No. 25, 30, 33, 40, 44, 45, 52, 850, 900, 950, 960, 970, 980, 1000, 2200B, 2300, 2350 and 2600; and MA7, MA8, MA77, MA100 and MA230 (all manufactured by Mitsubishi Chemical Corporation);

RAVEN 760UP, 780UP, 860UP, 900P, 1000P, 1060UP, 1080UP and 1255 (all manufactured by Columbian Carbon Company);

REGAL 330R, 400R, 660R and MOGUL L (all manufactured by Cabot Corporation); and

Nipex 160IQ, 170IQ, 35 and 75; PrinteX 30, 35, 40, 45, 55, 75, 80, 85, 90, 95 and 300; Special Black 350 and 550; and Nerox 305, 500, 505, 600 and 605 (all manufactured by Orion Engineered Carbons S.A.), and any of these carbon blacks can be used favorably.

Further, for the titanium oxide, either the anatase form or the rutile form may be used. In one embodiment, use of the rutile form is preferred in terms of increasing the opacity of the printed items. Further, titanium oxide produced by either the chlorine method or the sulfuric acid method may be used, but using titanium oxide produced by the chlorine method yields a high degree of whiteness, and is consequently preferred.

Further, the titanium oxide used in the aqueous inkjet ink is preferably a titanium oxide that has been subjected to a surface treatment with an inorganic compound and/or an organic compound. Examples of the inorganic compound include compounds of silicon (Si), aluminum, zirconium, tin, antimony and titanium, as well as hydrates of these compounds. Further, examples of the organic compound include polyhydric alcohols and alkanolamines and derivatives thereof, higher fatty acids and metal salts thereof, polysiloxane compounds, and organometallic compounds. Among these, polyhydric alcohols and derivatives thereof yield a high degree of hydrophobization of the titanium oxide surface, enabling an improvement in the ink storage stability, and can therefore be used particularly favorably.

In the aqueous inkjet ink, in order to adjust the hue and color development properties of the printed items to values within a desired range, a mixture of a plurality of the above pigments may be used. For example, in order to improve the color tone at low print ratios, a small amount of one or more pigments selected from among cyan organic pigments, magenta organic pigments, orange organic pigments and brown organic pigments may be added to a black ink that uses a carbon black pigment.

<Pigment Dispersing Resin>

Examples of methods for stably dispersing the pigment in an aqueous ink and maintaining that dispersion include (1) a method in which dispersion is achieved by adsorbing a water-soluble pigment dispersing resin to the pigment surface, (2) a method in which dispersion is achieved by adsorbing a water-soluble and/or water-dispersible surfactant to the pigment surface, (3) a method of chemically or physically introducing a hydrophilic functional group at the pigment surface, thereby achieving dispersion in the ink without requiring a dispersant or a surfactant (self-dispersing pigment), and (4) a method of coating the pigment with a water-insoluble resin, and if necessary, subsequently using a separate water-soluble pigment dispersing resin or surfactant to disperse the coated pigment in the ink.

In the above aqueous ink, among the methods described above, either the method (1) or (4), namely a method that uses a pigment dispersing resin, is preferably selected. Moreover, the pigment dispersing resin preferably contains from 20 to 90% by mass of a monomer having an aromatic ring structure relative to the total mass of all the monomers that constitute the pigment dispersing resin. This type of embodiment has the objectives of improving the adhesion and image quality as a result of π-cation interactions formed between the aromatic rings contained in the pigment dispersing resin and the coagulant (C) contained in the pretreatment liquid, and ensuring and improving the storage stability in aqueous inkjet inks containing a water-soluble organic solvent.

In the present description, the term "pigment dispersing resin" means a resin that contributes to the dispersion of the pigment, and is defined as a generic term that includes both water-soluble pigment dispersing resins used in methods (1) and (4) described above, and water-insoluble resins used in method (4) above. Further, a "water-insoluble resin" describes a resin for which a 1% by mass aqueous solution of the resin at 25° C. does not appear transparent to the naked eye.

In the aqueous ink described above, among the methods described above, selection of the method (1) that uses a water-soluble pigment dispersing resin is particularly preferred. The reason for this preference is that by appropriate investigation and selection of the monomer composition and the molecular weight of the resin, the resin adsorption capability relative to the pigment and the electric charge of the pigment dispersing resin can be easily adjusted. As a result, an improvement in the ink storage stability, and better control of the pigment aggregation function provided by the pretreatment liquid of an embodiment of the present invention can be achieved.

There are no particular limitations on the types of pigment dispersing resins that may be used. Examples of resins that may be used include (meth)acrylic resins, styrene-(meth)acrylic resins, maleic acid (anhydride) resins, styrene-maleic acid (anhydride) resins, olefin-maleic acid (anhydride) resins, polyurethane resins, polyurea resins, polyurethane urea resins, and polyester resins. Among these, in terms of having a greater range of selectable materials containing a monomer having an aromatic ring structure, and in terms of ease of synthesis, the use of a (meth)acrylic resin, a styrene-(meth)acrylic resin, a polyurethane resin or a polyester resin is particularly preferred. The pigment dispersing resin may be synthesized using a conventional method, or a commercially available resin may be used.

In one embodiment, the pigment dispersing resin used in the aqueous inkjet ink preferably contains from 20 to 90% by mass of a monomer having an aromatic ring structure relative to the total mass of all the monomers that constitute the pigment dispersing resin. The amount of the above monomer relative to the total mass of the pigment dispersing resin is more preferably from 20 to 80% by mass, and particularly preferably from 20 to 70% by mass. By ensuring that the amount of aromatic ring structures falls within the above range, a favorable improvement effect in the adhesion and image quality arising from π-cation interactions, and an effect that ensures and improves the storage stability in an aqueous ink containing a water-soluble organic solvent having a low boiling point can both be achieved.

In one embodiment, in addition to the above aromatic ring structure, the pigment dispersing resin preferably also contains an alkyl group of 10 to 36 carbon atoms. By ensuring that the alkyl group has 10 to 36 carbon atoms, the viscosity of the pigment dispersion can be lowered, a further improvement in image quality can be obtained, and an improvement in the storage stability can also be achieved.

From the viewpoints of ensuring favorable compatibility with the water-soluble organic solvent in the aqueous inkjet ink and achieving favorable drying properties for the printed items, the number of carbon atoms in the alkyl group is preferably from 12 to 30, and more preferably from 18 to 24.

Provided the number of carbon atoms in the alkyl group is within the range from 10 to 36, the group may be linear or branched, but a linear alkyl group is preferred. Examples of linear alkyl groups include a lauryl group (C12), myristyl group (C14), cetyl group (C16), stearyl group (C18), arachyl group (C20), behenyl group (C22), lignoceryl group (C24), cerotyl group (C26), montanyl group (C28), melissyl group (C30), dotriacontanyl group (C32), tetratriacontanyl group (C34), and hexatriacontanyl group (C36).

From the viewpoint of achieving a combination of reduced viscosity for the pigment dispersion and superior abrasion resistance, drying properties, blocking resistance and gloss for the printed items, the amount of the monomer having an alkyl group of 10 to 36 carbon atoms contained within the pigment dispersing resin is preferably from 5 to 60% by mass, more preferably from 15 to 55% by mass, and particularly preferably from 25 to 50% by mass.

In one embodiment, in addition to the aromatic ring structure, the pigment dispersing resin preferably also contains an alkylene oxide group. By introducing an alkylene oxide group, the hydrophilicity and hydrophobicity of the pigment dispersing resin can be adjusted arbitrarily, and therefore the storage stability of the aqueous ink can be improved. In addition, because the alkylene oxide group undergoes hydrogen bonding with the surfactant (B) in the pretreatment liquid, the effects provided by the resin microparticles (A) can be favorably realized, and the adhesion of the printed items increases dramatically.

In order to favorably realize the above functionality, in those cases where a water-soluble pigment dispersing resin is used as the pigment dispersing resin, an ethylene oxide group is preferably selected as the alkylene oxide group. On the other hand, in those cases where a water-insoluble resin is used as the pigment dispersing resin, a propylene oxide group is preferably selected as the alkylene oxide group.

From the viewpoint of achieving a combination of reduced viscosity for the pigment dispersion, superior storage stability for the aqueous ink, and superior adhesion for the printed items, the amount of the monomer having an alkylene oxide group included in the pigment dispersing resin is preferably from 5 to 40% by mass, more preferably from 10 to 35% by mass, and particularly preferably from 15 to 30% by mass.

In order to achieve and maintain stable dispersion of the pigment in the aqueous ink, the method (1) described above is preferably selected. In the water-soluble pigment dispersing resin used as the pigment dispersing resin in the above method (1), in order to improve the degree of solubility in the ink, it is preferable that acid groups within the water-soluble pigment dispersion are neutralized with a base. From the viewpoint of enabling the pigment dispersing resin (water-soluble pigment dispersing resin) to be dissolved in the ink without impairing the effects provided by the coagulant (C) in the pretreatment liquid, the amount added of the base is preferably adjusted. In one embodiment, the base is added so that the pH of a 10% by mass aqueous solution of the pigment dispersing resin is preferably within a range from 7 to 11.5, and more preferably from 7.5 to 11.

Examples of the base used for neutralizing the pigment dispersing resin in the manner described above include alkanolamines such as diethanolamine, triethanolamine and N-methyldiethanolamine; ammonia water; alkali metal hydroxides such as lithium hydroxide, sodium hydroxide and potassium hydroxide; and alkali metal carbonates such as lithium carbonate, sodium carbonate, sodium hydrogen carbonate and potassium carbonate.

Further, in order to achieve and maintain stable dispersion of the pigment in the aqueous ink, the method (1) described above is preferably selected. The water-soluble pigment dispersing resin used as the pigment dispersing resin in the above method (1) preferably has an acid value of 30 to 375 mgKOH/g. Adjusting the acid value to a value within this range enables the solubility of the pigment dispersing resin (water-soluble pigment dispersing resin) in water to be ensured, and also means interactions between pigment dispersing resin molecules are favorable, thereby suppressing the viscosity of the pigment dispersion.

Provided the acid value is at least 30 mgKOH/g, the solubility in water is favorable, and the viscosity of the pigment dispersion can be suppressed. Provided the acid value is not more than 375 mgKOH/g, the storage stability of the aqueous inkjet ink is excellent. The acid value of the pigment dispersing resin (water-soluble pigment dispersing resin) is more preferably from 65 to 340 mgKOH/g, even more preferably from 100 to 300 mgKOH/g, and particularly preferably from 135 to 270 mgKOH/g.

In another method, the method (4) described above may also be selected favorably. In the method (4), the water-insoluble resin used as the pigment dispersing resin has an acid value that is preferably within a range from 0 to 100 mgKOH/g, more preferably from 5 to 90 mgKOH/g, and even more preferably from 10 to 80 mgKOH/g. By adjusting the acid value of the pigment dispersing resin (water-insoluble dispersing resin) to a value within this range, printed items having excellent blocking resistance and abrasion resistance can be obtained.

The acid value of the pigment dispersing resin represents the number of mg of potassium hydroxide (KOH) required to neutralize the acid contained in 1 g of the pigment dispersing resin, and is a value obtained by titration of a solution of the resin in a mixed solvent of ethanol and toluene using a KOH solution. Measurement of the acid value can be performed, for example, using an automatic potentiometric titrator AT-610 manufactured by Kyoto Electronics Manufacturing Co., Ltd.

In one embodiment, the molecular weight of the pigment dispersing resin is preferably a weight average molecular weight that is at least 1,000 but not more than 300,000, and more preferably at least 5,000 but not more than 200,000. When the weight average molecular weight falls within this range, the pigment can be dispersed stably in water, thereby improving the aqueous ink storage stability, and making it easier to adjust the viscosity when the resin is used in an aqueous ink.

Provided the weight average molecular weight is at least 1,000, the pigment dispersing resin is resistant to dissolution in the water-soluble organic solvent that is added to the aqueous ink. Accordingly, adsorption of the dispersion resin to the pigment strengthens, and the storage stability of the ink improves. Provided the weight average molecular weight is not more than 300,000, not only can the viscosity be kept low during dispersion, but the discharge stability from the inkjet head is more favorable, enabling stable printing to be performed over a long period of time. The weight average molecular weight of pigment dispersing resin can be measured in the same manner as that described above for the weight average molecular weight of the cationic polymer compound.

In the aqueous inkjet ink of an embodiment of the present invention, the blend amount of the pigment dispersing resin is preferably from 2 to 60% by mass relative to the pigment. By ensuring that the blend amount of the pigment dispersing resin relative to the pigment is within a range from 2 to 60% by mass, the viscosity of the pigment dispersion can be suppressed, and the storage stability of the pigment dispersion and the aqueous inkjet ink can be easily improved. Further, when mixed with the pretreatment liquid of the present invention, aggregation occurs rapidly. The ratio of the pigment dispersing resin relative to the pigment is more preferably from 4 to 55% by mass, and even more preferably from 5 to 50% by mass.

As described below, the aqueous inkjet ink of an embodiment of the present invention preferably contains a binder resin. In those cases where a water-soluble pigment dispersing resin is used as the pigment dispersing resin and a water-soluble resin is also used as the binder resin, an example of the method used for distinguishing between the water-soluble pigment dispersing resin and the binder resin is the method described below, which applies the method disclosed in JIS K 5101-1-4.

Twenty parts of a carbon black having a primary particle size of 15 to 25 nm, a nitrogen adsorption specific surface area of 120 to 260 $m^2/g$, and a DBP absorption (granules) of 40 to 80 $cm^3/100$ g, 10 parts of resin, and 70 parts of water are mixed thoroughly (premixing). Subsequently, this mixture is subjected to a dispersion treatment for 2 hours using a beads mill (for example, a Dyno-Mill manufactured by Shinmaru Enterprises Corporation) with a capacity of 0.6 L filled with 1,800 parts of zirconia grinding beads of diameter 0.5 mm.

Following this dispersion treatment, the viscosity of the thus obtained carbon black dispersion at 25° C. is measured using an E-type viscometer (for example, an ELD viscometer manufactured by Toki Sangyo Co., Ltd.). Subsequently, the carbon black dispersion is stored for one week in a thermostatic chamber at 70° C., and the viscosity is then remeasured.

If the viscosity of the dispersion immediately following dispersion, measured in the manner described above, is 100 mPa·s or less, and the absolute value of the change in viscosity of the carbon black dispersion after the storage period is 10% or less, then the resin is deemed to be a water-soluble pigment dispersing resin.

<Water-Soluble Organic Solvent>

The aqueous inkjet ink described above contains a water-soluble organic solvent. In one embodiment, the amount of water-soluble organic solvent having a boiling point at one atmosphere of 250° C. or higher, relative to the total mass of the aqueous inkjet ink, is preferably not more than 5% by mass (and may be 0% by mass). By ensuring that the amount of high-boiling point water-soluble organic solvents is not more than 5% by mass, favorable drying properties and discharge stability can be more easily obtained for the aqueous inkjet ink. Moreover, when the aqueous ink is combined with the pretreatment liquid, image defects such as bleeding can be suppressed, and the blocking resistance is more favorable. Further, from the viewpoint of further improving the image quality and the blocking resistance, the amount of water-soluble organic solvent having a boiling point at one atmosphere of 250° C. or higher in the aqueous ink is preferably not more than 2% by mass, and more preferably 1% by mass or less (and may be 0% by mass).

Furthermore, for the same reasons, the amount of water-soluble organic solvent having a boiling point at one atmosphere of 220° C. or higher, relative to the total mass of the aqueous inkjet ink, is preferably not more than 5% by mass (and may be 0% by mass), and is particularly preferably 2% by mass or less (and may be 0% by mass). The amount of water-soluble organic solvent having a boiling point at one atmosphere of 220° C. or higher is a value that is calculated so as to include any water-soluble organic solvents having a boiling point at one atmosphere of 250° C. or higher.

In one embodiment, the weighted boiling point average at one atmosphere of the water-soluble organic solvents contained in the aqueous inkjet ink is preferably from 145 to 215° C., more preferably from 150 to 200° C., and particularly preferably from 155 to 190° C. By adjusting the weighted boiling point average of the water-soluble organic solvent to a value within this range, when the aqueous ink is used in combination with the pretreatment liquid of an embodiment of the present invention, printed items of excellent image quality can be obtained even during high-speed printing, and superior discharge stability can also be obtained.

The calculation of the weighted boiling point average includes the aforementioned water-soluble organic solvents having a boiling point at one atmosphere of 250° C. or higher and the water-soluble organic solvents having a boiling point of 220° C. or higher. The weighted boiling point average at one atmosphere is a value obtained by calculating, for each water-soluble organic solvent, the product of the boiling point at one atmosphere and the mass ratio of that organic solvent relative to the total mass of all of the water-soluble organic solvents, and then adding together the calculated products for the various water-soluble organic solvents.

The total mass of the water-soluble organic solvent used in the aqueous inkjet ink, relative to the total mass of the aqueous inkjet ink, is preferably from 3 to 40% by mass. Moreover, from the viewpoints of achieving excellent discharge stability from the nozzles, as well as ensuring satisfactory wetting properties and drying properties when combined with the pretreatment liquid, and obtaining printed items having excellent adhesion and image quality, the total mass of the water-soluble organic solvent is more preferably from 5 to 35% by mass, and particularly preferably from 8 to 30% by mass. By ensuring that the total mass of the water-soluble organic solvent is at least 3% by mass, the moisture retention of the ink is more favorable, and an ink of excellent discharge stability is obtained. Further, by ensuring that the amount of the water-soluble organic solvent is not more than 40% by mass, an ink having favorable drying properties is obtained, and printed items of excellent image quality are obtained.

In one embodiment, from the viewpoint of the compatibility and affinity between the pretreatment liquid and the material components contained in the aqueous inkjet ink such as the pigment dispersing resin, and the binder resin and surfactant described below, the aqueous ink preferably contains a glycol ether-based solvent and/or an alkyl polyol-based solvent as the water-soluble organic solvent.

Specific examples of glycol ether-based solvents having a boiling point at one atmosphere of less than 250° C. that can be used favorably include:

glycol monoalkyl ethers such as ethylene glycol monoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether, triethylene glycol monomethyl ether, propylene glycol monomethyl ether, propylene glycol monoethyl ether, propylene glycol monopropyl ether, dipropylene glycol monomethyl ether, dipropylene glycol monoethyl ether, dipropylene glycol monopropyl ether, dipropylene glycol monobutyl ether, tripropylene glycol monomethyl ether, 1,2-butylene glycol monomethyl ether and 1,3-butylene glycol monomethyl ether; and glycol dialkyl ethers such as diethylene glycol diethyl ether, diethylene glycol isopropyl methyl ether, diethylene glycol butyl methyl ether, triethylene glycol dimethyl ether and triethylene glycol methyl ethyl ether.

In particular, in terms of achieving a combination of excellent moisture retention and drying properties, among the glycol ether-based solvents listed above, at least one solvent is preferably selected from the group consisting of ethylene glycol monobutyl ether, diethylene glycol monoethyl ether, diethylene glycol monopropyl ether, diethylene glycol monobutyl ether, propylene glycol monomethyl ether, propylene glycol monoethyl ether, propylene glycol monopropyl ether, dipropylene glycol monomethyl ether, dipropylene glycol monoethyl ether, dipropylene glycol monopropyl ether, dipropylene glycol monobutyl ether, 1,2-butylene glycol monomethyl ether, 1,3-butylene glycol monomethyl ether, diethylene glycol butyl methyl ether and triethylene glycol methyl ethyl ether.

Specific examples of alkyl polyol-based solvents having a boiling point at one atmosphere of less than 250° C. include 1,2-ethanediol (ethylene glycol), 1,2-propanediol (propylene glycol), 1,3-propanediol, 1,2-butanediol, 1,3-butanediol, 1,4-butanediol, 1,2-pentanediol, 1,5-pentanediol, 1,2-hexanediol, 2,2-dimethyl-1,3-propanediol, 2-methyl-1,3-propanediol, 2-ethyl-2-methyl-1,3-propanediol, 3-methyl-1,3-butanediol, 2-methylpentan-2,4-diol, 2-ethyl-1,3-hexanediol, diethylene glycol and dipropylene glycol.

In terms of achieving a combination of excellent moisture retention and drying properties, among the alkyl polyol-based solvents listed above, at least one solvent is preferably selected from the group consisting of 1,2-propanediol, 1,3-propanediol, 1,2-butanediol, 1,3-butanediol, 1,2-pentanediol, 1,2-hexanediol, diethylene glycol and dipropylene glycol.

<Binder Resin>

The aqueous inkjet ink described above preferably contains a binder resin. The form of the binder resin may be either a water-soluble resin or resin microparticles. A combination of two or more types of binder resin may also be used depending on the characteristics required of the aqueous inkjet ink and the printed items.

For example, resin microparticles can lower the viscosity of the aqueous inkjet ink and allow the resin to be added in a larger amount, and are therefore suitable for enhancing the durability of the printed items. Further, aqueous inkjet inks that use a water-soluble resin as the binder resin exhibit excellent discharge stability, and yield excellent printed item image quality when combined with the pretreatment liquid of an embodiment of the present invention.

The types of resins that can be used favorably as the binder resin are the same types of resins as those described above for the resin microparticles (A) contained in the pretreatment liquid. Among the various possibilities, from the viewpoints of improving the storage stability of the aqueous inkjet ink, and more easily obtaining superior adhesion and abrasion resistance for the printed items when used in combination with the pretreatment liquid of an embodiment of the present invention, (meth)acrylic resins, styrene-(meth)acrylic resins, polyurethane resins, polyurea resins, polyurethane urea resins and polyolefin resins can be used particularly favorably.

In those cases where a water-soluble resin is used as the binder resin, from the viewpoint of achieving a combination of favorable discharge stability for the aqueous inkjet ink and superior abrasion resistance for the printed items, the weight average molecular weight of the water-soluble resin is preferably within a range from 5,000 to 80,000, more preferably within a range from 8,000 to 60,000, and particularly preferably within a range from 10,000 to 50,000.

For similar reasons, the acid value of the water-soluble resin is preferably from 5 to 80 mgKOH/g, and more preferably from 10 to 50 mgKOH/g.

The amount of the binder resin, expressed as a solid fraction amount within the total mass of the aqueous inkjet ink, is preferably from 1 to 20% by mass, moreover preferably from 2 to 15% by mass, and particularly preferably from 3 to 10% by mass.

<Surfactant>

In the aqueous ink described above, a surfactant is preferably used for the purpose of adjusting the surface tension and improving the image quality. On the other hand, if the surface tension is too low, then the nozzle surface of the inkjet head tends to become wet by the aqueous ink, leading to a deterioration in discharge stability, and therefore selection of the type of surfactant and the amount added of the surfactant are extremely important.

From the viewpoints of ensuring favorable wetting properties relative to the substrate and optimizing the discharge stability from the nozzles, the use of a siloxane-based, acetylene diol-based or fluorine-based surfactant, or an aforementioned polyoxyalkylene alkyl ether represented by general formula (1) is preferred. Among these, the use of a siloxane-based or acetylene diol-based surfactant is particularly preferred. The amount added of the surfactant, relative to the total weight of the aqueous ink, is preferably from 0.01 to 5.0% by mass, and is more preferably from 0.05 to 3.0% by mass.

The surfactant used in the aqueous ink may be synthesized using conventional methods, or a commercially available product may be used.

When the surfactant is selected from commercially available products, examples of siloxane-based surfactants that may be used include:

BY16-201, FZ-77, FZ-2104, FZ-2110, FZ-2162, F-2123, L-7001, L-7002, SF8427, SF8428, SH3749, SH8400, 8032 Additive and SH3773M (all manufactured by Dow Corning Toray Co., Ltd.), TEGO Glide 410, TEGO Glide 432, TEGO Glide 435, TEGO Glide 440, TEGO Glide 450, TEGO Twin 4000, TEGO Twin 4100, TEGO Wet 250, TEGO Wet 260, TEGO Wet 270 and TEGO Wet 280 (all manufactured by Evonik Degussa GmbH), SAG-002 and SAG-503A (manufactured by Nissin Chemical Co., Ltd.), BYK-331, BYK-333, BYK-345, BYK-346, BYK-347, BYK-348, BYK-349, BYK-UV3500, and BYK-UV3510 (all manufactured by BYK-Chemie GmbH), and KF-351A, KF-352A, KF-353, KF-354L, KF355A, KF-6004, KF-6011, KF-6012, KF-6013, KF-6015, KF-6016, KF-6017, KF-6043, KF-615A, KF-640, KF-642, and KF-643 (all manufactured by Shin-Etsu Chemical Co., Ltd.).

Further, examples of acetylene diol-based surfactants that may be used include:

Surfynol 61, 104E, 104H, 104A, 104BC, 104DPM, 104PA, 104PG-50, 420, 440, 465, 485, SE and SE-F, and Dynol 604 and 607 (all manufactured by Air Products and Chemicals, Inc.), and OLFINE E1004, E1010, E1020, PD-001, PD-002W, PD-004, PD-005, EXP. 4001, EXP. 4200, EXP. 4123 and EXP. 4300 (all manufactured by Nissin Chemical Co., Ltd.).

Moreover, examples of fluorine-based surfactants that may be used include: Zonyl TBS, FSP, FSA, FSN-100, FSN, FSO-100, FSO, FS-300, Capstone FS-30 and FS-31 (all manufactured by E. I. du Pont de Nemours and Company), and PF-151N and PF-154N (manufactured by Omnova Solutions Inc.).

One of the above surfactants may be used alone, or a combination of two or more surfactants may be used.

The surfactant used in the aqueous ink and the surfactant used in the pretreatment liquid may be the same or different. When mutually different surfactants are used, the blend amounts are preferably determined with due care taken of the surface tension of both surfactants.

<Water>

The water included in the above aqueous ink is preferably not a typical water containing various ions, and the use of an ion-exchanged water (deionized water) is preferred.

The amount of water that may be used in the aqueous ink is preferably within a range from 20 to 90% by mass relative to the total mass of the ink.

<Other Components>

If required, the aqueous ink described above may also include other components besides the various components described above in order to achieve an ink having the desired physical properties. For example, a pH adjuster may be added to the aqueous ink, and any material having a pH-adjusting function may be selected as the pH adjuster.

For example, in those cases where the aqueous ink needs to be made more basic, examples of materials that may be used as the pH adjuster include alkanolamines such as dimethylethanolamine, diethanolamine, triethanolamine and N-methyldiethanolamine; ammonia water; alkali metal hydroxides such as lithium hydroxide, sodium hydroxide and potassium hydroxide; and alkali metal carbonates such as lithium carbonate, sodium carbonate, sodium hydrogen carbonate and potassium carbonate.

Further, in those cases where the aqueous ink needs to be made more acidic, examples of materials that may be used as the pH adjuster include hydrochloric acid, sulfuric acid, acetic acid, citric acid, maleic acid, maleic anhydride, succinic acid, tartaric acid, malic acid, phosphoric acid, boric acid, fumaric acid, malonic acid, ascorbic acid and glutamic acid. One of the above pH adjusters may be used alone, or a combination of two or more pH adjusters may be used.

The blend amount of the pH adjuster, relative to the total mass of the aqueous inkjet ink, is preferably from 0.01 to 5% by mass, more preferably from 0.1 to 3% by mass, and most preferably from 0.2 to 1.5% by mass. By ensuring that the blend amount of the pH adjuster falls within the above range, pH changes caused by dissolution of carbon dioxide from the air or the like can be suppressed, and the aggregation effect caused by the coagulant (C) when the pretreatment liquid and the aqueous inkjet ink make contact is not impaired, enabling the effects of the present invention to be favorably realized.

Moreover, in addition to the components described above, appropriate amounts of other additives such as antifoaming agents, preservatives, infrared absorbers and ultraviolet absorbers may be added to the aqueous inkjet ink as required in order to achieve an ink having certain desired physical property values. The amount added of these additives is, for example, preferably from 0.01 to 5% by mass relative to the total mass of the ink.

In a similar manner to the pretreatment liquid, the aqueous inkjet ink preferably contains substantially no polymerizable monomers.

<Aqueous Inkjet Ink Set>

In an ink set of an embodiment of the present invention, a single color of the aqueous inkjet ink may be used, but depending on the application, an aqueous inkjet ink set containing a combination of a plurality of colors may also be used. There are no particular limitations on the combination of aqueous inks in the ink set, but by using the three colors of cyan, yellow and magenta, full-color images can be obtained. Further, by also adding a black ink, the level of blackness can be improved, and the legibility of text and the like can be improved. Moreover, by also adding other colors such as orange and green, the color reproducibility can be improved. In the case of a transparent film substrate, which represents one example of an impermeable substrate, printing to the transparent film using a white ink enables more distinct images to be obtained. In particular, printing with a white ink can be used to improve the clarity and legibility of text and the like that has been printed with black ink, and therefore a white ink can be included favorably in the ink set.

<Method for Producing Aqueous Inkjet Ink>

The aqueous inkjet ink described above is produced using the components described above, for example by the processes described below. However, the method for producing the aqueous inkjet ink is not limited to the processes described below.

(1) Production of Pigment Dispersion

In those cases where a water-soluble pigment dispersing resin is used as the pigment dispersing resin, the water-soluble pigment dispersing resin, water, and if necessary, a water-soluble organic solvent are mixed and stirred to prepare a water-soluble pigment dispersing resin mixture. The pigment is then added to this water-soluble pigment dispersing resin mixture, and following mixing and stirring (premixing), a dispersion treatment is performed using a dispersion device. Subsequently, centrifugal separation, filtration and adjustment of the solid fraction concentration may be performed as required to obtain a pigment dispersion.

Further, when producing a dispersion of a pigment that has been coated with a water-insoluble resin, the water-insoluble resin is first dissolved in an organic solvent such as methyl ethyl ketone, and the water-insoluble resin is then neutralized as required to produce a water-insoluble resin solution. The pigment and water are then added to this water-insoluble resin solution, and following mixing and stirring (premixing), a dispersion treatment is performed using a dispersion device. Subsequently, the above organic solvent is removed by distillation under reduced pressure, and centrifugal separation, filtration and adjustment of the solid fraction concentration may then be performed as required to obtain a pigment dispersion.

The dispersion device used for the pigment dispersion treatment may be any typically used dispersion device. Examples include a ball mill, roll mill, sand mill, beads mill and nanomizer. Among these, a beads mill can be used particularly favorably. Specific examples include devices available commercially with product names such as Super-mill, Sand Grinder, Agitator Mill, Glen Mill, Dyno-Mill, Pearl Mill and CoBall Mill.

Examples of methods for controlling the particle size distribution of the pigment dispersion include reducing the size of the grinding media in the aforementioned dispersion device, altering the material used for the grinding media, increasing the grinding media filling ratio, altering the shape of the stirring member (agitator), lengthening the dispersion treatment time, performing classification with a filter or a centrifugal separator or the like after the dispersion treatment, or a combination of these methods.

In order to ensure that the pigment size falls within the preferred particle size range, the diameter of the grinding media in the above dispersion device is preferably from 0.1 to 3 mm. Further, examples of materials that can be used favorably as the grinding media include glass, zircon, zirconia and titania.

(2) Preparation of Aqueous Inkjet Ink

The water-soluble organic solvent, water, and where necessary the binder resin, surfactant and other additives described above are added to and mixed with the pigment dispersion prepared in the manner described above. If necessary, the mixture of the above components may be stirred and mixed while being heated at a temperature within a range from 40 to 100° C.

(3) Removal of Coarse Particles

Coarse particles contained in the mixture obtained following the stirring and mixing described above can be removed using a technique such as filtration separation or centrifugal separation, thus obtaining the aqueous inkjet ink. Conventional methods may be used as appropriate for the filtration separation method. Further, there are no particular limitations on the filter pore size, provided coarse particles and dust can be removed. For example, the pore size is preferably from 0.3 to 5 μm, and more preferably from 0.5 to 3 μm. When filtration is performed, a single type of filter may be used, or a combination of a plurality of filters may be used.

<Properties of Aqueous Inkjet Ink>

The viscosity of the aqueous inkjet ink at 25° C. is preferably adjusted to value within a range from 3 to 20 mPa·s. Provided the viscosity is within this range, the aqueous ink exhibits stable discharge characteristics from inkjet heads having a typical frequency of 4 to 10 kHz through to inkjet heads having a high frequency of 10 to 70 kHz. In particular, by ensuring that the viscosity at 25° C. is within a range from 4 to 10 mPa·s, stable discharge can be achieved even when the aqueous ink is used with an inkjet head having a design resolution of 600 dpi or higher.

The viscosity mentioned can be measured using normal methods. Specifically, the viscosity can be measured with an E-type viscometer (TVE25L viscometer, manufactured by Toki Sangyo Co., Ltd.), using 1 mL of the ink.

In one embodiment, in terms of not only obtaining an aqueous inkjet ink capable of stable discharge, but also enabling printed items having excellent adhesion and image quality to be produced in combination with the pretreatment liquid of an embodiment of the present invention, the static surface tension of the aqueous inkjet ink at 25° C. is preferably from 18 to 35 mN/m, more preferably from 19 to 32 mN/m, and particularly preferably from 20 to 28 mN/m.

Further, from the viewpoint of preventing mixed color bleeding and color irregularities in the printed items, and obtaining printed items having dramatically superior image quality, it is preferable that the types and amounts of the water-soluble organic solvent and the surfactant are adjusted so that the surface tension of the aqueous ink is no higher than the surface tension of the pretreatment liquid. The static surface tension can be measured, for example, using a surface tension meter (CBVP-Z manufactured by Kyowa Interface Science Co., Ltd.), with measurement performed at 25° C. by the platinum plate method.

For the same reasons as those mentioned above, the dynamic surface tension of the aqueous inkjet ink at 25° C. and 10 msec is preferably from 25 to 40 mN/m, more preferably from 28 to 38 mN/m, and particularly preferably from 30 to 36 mN/m. The dynamic surface tension cane be measured using a bubble pressure dynamic surface tension meter BP100 manufactured by Kruss GmbH, with measurement performed at 25° C. using the maximum bubble pressure method.

In one embodiment, from the viewpoint of obtaining printed items having excellent color development, the aqueous inkjet ink preferably contains a pigment having an average secondary particle size (D50) from 40 nm to 500 nm, more preferably from 50 nm to 400 nm, and particularly preferably from 60 nm to 300 nm. In order to ensure that the average secondary particle size falls within the above preferred range, the pigment dispersion treatment process is preferably controlled in the manner described above.

The average secondary particle size of the pigment can be measured using the same method as that described above for measuring the particle size of the resin microparticles (A). In those cases where the aqueous inkjet ink contains resin microparticles as the binder resin, it is preferable that the pigment particle size is measured using an ink that has been prepared with the blend amount of the resin microparticles substituted with an equivalent amount of water.

3. Printed Item and Method for Producing Same

One embodiment relates to a pretreated substrate having a layer formed from the pretreatment liquid of an embodiment of the present invention on top of an impermeable substrate. Further, another embodiment relates to a printed item having the above pretreated substrate, and a printed layer that has been formed on the pretreated substrate using an aqueous inkjet ink containing a pigment, a water-soluble organic solvent and water. In one embodiment, the printed item may be produced using an ink set containing the pretreatment liquid of an embodiment of the present invention and the aqueous inkjet ink described above.

There are no particular limitations on the method used for producing a printed item using an embodiment of the ink set (recording liquid set) containing a combination of the pretreatment liquid of the present invention and the aqueous inkjet ink described above. For example, a method that includes a step of applying the pretreatment liquid described above to an impermeable substrate, a step of applying the aqueous inkjet ink described above by one-pass inkjet printing to the portion of the impermeable substrate to which the pretreatment liquid has been applied, and a step of drying the impermeable substrate to which the aqueous inkjet ink has been applied can be used favorably. In the above method, the steps are preferably performed in the order described above.

In the present description, "one-pass inkjet printing" describes a method in which either the inkjet head is scanned only once across a stationary substrate, or the substrate is passed only once beneath a stationary inkjet head, and is a method in which no ink is overprinted on top of previously printed ink. However, in those cases where the inkjet head is scanned, the discharge timing must be adjusted in accordance with the movement of the inkjet head, and there is an increased likelihood of variation in the impact position. As a result, in one embodiment, when printing the aqueous ink, the method in which the substrate is passed beneath a stationary inkjet head can be used particularly favorably.

A more detailed description of a method for producing a printed item using an ink set (recording liquid set) of an embodiment of the present invention is described below.

<Pretreatment Liquid Application Method>

When producing a printed item using a recording liquid set of an embodiment of the present invention, it is preferable that the pretreatment liquid is applied to the impermeable substrate prior to printing of the aqueous inkjet ink. The method used for applying the pretreatment liquid may be either a non-contact method for printing to the substrate such as inkjet printing, or a printing method in which the pretreatment liquid is brought into contact with the substrate.

Further, in the case where a printing method in which the pretreatment liquid is brought into contact with the substrate is selected, examples of methods that can be used favorably for applying the pretreatment liquid include methods using an offset gravure coater, gravure coater, doctor coater, bar coater, blade coater, flexo coater, or a roller configuration such as a roll coater.

<Drying Method Following Application of Pretreatment Liquid>

During use of the above recording liquid set, the impermeable substrate may be dried following application of the pretreatment liquid to the impermeable substrate, so that the pretreatment liquid is dried completely on the impermeable substrate before the aqueous inkjet ink is applied. Alternatively, the aqueous inkjet ink may be applied before the pretreatment liquid has dried completely on the substrate.

In one embodiment, it is preferable that the pretreatment liquid is dried completely before the aqueous inkjet ink is applied, namely, that a state is obtained in which the liquid components of the pretreatment liquid have been completely removed. By applying the aqueous inkjet ink once the pretreatment liquid has been completely dried, the problem of unsatisfactory drying of the subsequently adhered aqueous inkjet ink does not occur, and printed items of excellent abrasion resistance can be obtained.

There are no particular limitations on the drying method used during printing of the pretreatment liquid. Examples of the drying method include conventionally known methods such as heated drying methods, hot air drying methods, infrared drying methods, microwave drying methods and drum drying methods. One of these drying methods may be used alone, or a combination of a plurality of methods may be used. In order to reduce any damage to the impermeable substrate and ensure efficient drying, a hot air drying method is preferably used. Further, from the viewpoints of limiting damage to the substrate and preventing sudden boiling of the liquid components in the pretreatment liquid, in those cases where a heated drying method is used, the drying temperature is preferably within a range from 35 to 100° C. Further, in those cases where a hot air drying method is employed, the hot air temperature is preferably from 50 to 150° C.

<Aqueous Inkjet Ink Application Method>

Printing of the aqueous inkjet ink preferably employs a method in which the ink is applied by one-pass inkjet printing to the portion of the impermeable substrate to which the pretreatment liquid has been applied. In terms of obtaining images of superior image quality, the design resolution of the inkjet head used in the one-pass inkjet printing is preferably at least 600 dpi (dots per inch), and is more preferably 720 dpi or higher.

<Drying Method Following Application of Aqueous Inkjet Ink>

Following printing of the aqueous inkjet ink, in order to dry the aqueous ink and any undried pretreatment liquid, the method preferably includes a step of drying the impermeable substrate to which the aqueous inkjet ink has been applied. Examples of drying methods that can be used favorably include the same methods as those described above for the pretreatment liquid.

<Coating Amounts of Pretreatment Liquid and Aqueous Inkjet Ink>

In one embodiment, when a recording liquid set is printed, the ratio of the coating amount of the aqueous inkjet ink relative to the coating amount of the pretreatment liquid is preferably at least 0.1 but not more than 10. This coating amount ratio is more preferably at least 0.5 but not more than 9, and particularly preferably at least 1 but not more than 8.

By ensuring that the coating amount ratio falls within the above range, changes in the texture of the substrate are avoided, and printed items having excellent image quality can be obtained.

<Impermeable Substrate>

In those cases where a printed item is produced using the recording liquid set described above, conventionally known substrates may be used as the impermeable substrate to which the pretreatment liquid is applied. Examples of substrates that may be used include thermoplastic resin substrates such as polyvinyl chloride sheets, polyethylene terephthalate (PET) films, polypropylene films, polyethylene films, nylon films, polystyrene films and polyvinyl alcohol films, and metal substrates such as aluminum foil. In each of the above substrates, the substrate surface that acts as the printing surface may be smooth or uneven. Further, the substrate may be transparent, semi-transparent or opaque. Furthermore, a substrate prepared by bonding together two or more of these substrates may also be used. Moreover, a releasable adhesive layer may be provided on the substrate on the opposite side from the printing surface, or an adhesive layer may be provided on the printed surface following printing. In one embodiment, the form of the substrate used in the printing using the ink set may be either in roll form or in sheet-like form.

Of the various possibilities, in order to satisfactorily realize the functions of the pretreatment liquid of the present invention, the impermeable substrate is preferably a thermoplastic resin substrate, and among thermoplastic resin substrates, PET films, polypropylene films, polyethylene films and nylon films are particularly desirable.

In one embodiment, in order to improve the image quality by ensuring uniform application of the pretreatment liquid, and dramatically improve the adhesion, the impermeable substrate described above is preferably subjected to a surface modification treatment such as a corona treatment or a plasma treatment.

<Coating Treatment>

The printed item produced using the recording liquid set may, if necessary, by subjected to a coating treatment of the printed surface. Specific examples of the coating treatment include application or printing of a coating composition, and lamination processing using a dry lamination method, solventless lamination method, or extrusion lamination method or the like, and any one of these treatments, or a combination of a plurality of treatments, may be used.

When a coating treatment of the printed item is performed by applying or printing a coating composition, the application or printing method may employ either a non-contact method for printing to the substrate such as inkjet printing, or a printing method in which the coating composition is brought into contact with the substrate. Further, in those cases where the coating composition is printed to the substrate by a non-contact method, an ink in which the colorant has been removed from the above aqueous inkjet ink, namely an ink containing substantially no colorant components (a clear ink), is preferably used as the coating composition.

Further, in those cases where lamination processing of the printed item is performed, the adhesive used for laminating the sealant material is preferably composed of a mixture of a polyol component and a polyisocyanate component.

In the above adhesive, the polyol component is a resin component having hydroxyl groups, and from the viewpoints of the coatability, the wettability of and permeability into the printed item interface, and the lamination strength following aging, a polyurethane resin or a polyester resin can be used favorably. Among the various possibilities, in terms of achieving favorable wetting properties at the interface with the printed item obtained using the recording liquid set of the embodiment described above, for example favorable wetting properties relative to the printed layer (printed portion) and the pretreatment liquid layer (non-printed portion), and achieving excellent lamination strength for the laminated printed item (laminate), the polyol component preferably contains a polyester polyol. For the polyol component, a single component may be used alone, or a combination of a plurality of components may be used.

On the other hand, in the above adhesive, the polyisocyanate component reacts with the polyol component to form urethane linkages, thereby increasing the molecular weight of the adhesive layer, and increasing the lamination strength. Among the various possibilities, from the viewpoints of the compatibility with the polyol component, the wetting properties at the interface with the printed item obtained using the recording liquid set of the present invention, and the lamination strength of the laminated printed item (laminate), the polyisocyanate component preferably contains an isocyanate group-terminated polyether-based urethane resin. Further, for the same reasons as mentioned above, the blend amount of the polyisocyanate component is preferably from 50 to 80% by mass relative to the mass of the polyol component. For the polyisocyanate component, a single component may be used alone, or a combination of a plurality of components may be used.

Examples of the sealant material used in the above lamination processing include polypropylene films and polyethylene films such as unstretched polypropylene (CPP) films and linear short-chain branched polyethylene (LL-DPE) films. Other sealant materials that may be used include films formed as a vapor deposition layer of a metal (oxide) such as aluminum oxide.

EXAMPLES

The pretreatment liquid, and the ink set (recording liquid set) containing the pretreatment liquid and an aqueous inkjet ink, which represent embodiments of the present invention, are described below in further detail using a series of examples and comparative examples. In the following description, unless specifically stated otherwise, "parts" and "%" represent "parts by mass" and "% by mass" respectively.

Examples 1 to 67, Comparative Examples 1 to 14

1. Production of Pretreatment Liquids (1-1) Titanium Oxide Dispersion Production Example The materials listed below were placed in a mixing container fitted with a stirrer, and mixing and stirring (premixing) was performed for one hour. Subsequently, a Dyno-Mill with a capacity of 0.6 L filled with 1,800 g of zirconia beads of diameter 1 mm was used to perform the main dispersion, thus obtaining a titanium oxide dispersion (pigment concentration: 50%).

| | |
|---|---|
| TIPAQUE CR-50-2 | 50 parts |
| BYK-190 (solid fraction: 40%) | 15 parts |
| 2-propanol | 5 parts |
| Ion-exchanged water | 30 parts |

In the above production example, TIPAQUE CR-50-2 is a titanium oxide manufactured by Ishihara Sangyo Kaisha, Ltd., and BYK-190 is an aqueous solution of a styrene-maleic acid resin manufactured by BYK-Chemie GmbH.

(1-2) PVA103 Varnish Production Example

The materials listed below were placed in a mixing container fitted with a stirrer, and following mixing and stirring for one hour, the mixture was heated to 90° C. and stirring was continued for an additional one hour. The temperature was then cooled to room temperature, and ion-exchanged water was used to adjust the solid fraction concentration to 25%, thus obtaining a PVA103 varnish.

| KURARAY POVAL PVA103 | 25 parts |
| Ion-exchanged water | 75 parts |

In the above production example, KURARAY POVAL PVA103 is a polyvinyl alcohol resin (water-soluble resin, melting point: 200° C.) manufactured by KURARAY Co., Ltd.

(1-3) Production Example for Pretreatment Liquid 1

The materials listed below were placed in a mixing container fitted with a stirrer, and following mixing for one hour at room temperature (25° C.), the mixture was heated to 50° C. and stirring was continued for an additional one hour. The mixture was then cooled to room temperature, and filtered through a membrane filter with a pore size of 1 μm, thus obtaining a pretreatment liquid 1.

| Joncryl 7100 (solid fraction: 48%) | 10.42 parts |
| EMALEX 715 | 0.13 parts |
| Aluminum nitrate | 5.0 parts |
| Ethanol | 5.0 parts |
| Ion-exchanged water | 77.1 parts |

In the above production example, Joncryl 7100 is styrene-acrylic resin microparticles (melting point: 120° C., solid fraction: 48%) manufactured by BASF Corporation, and EMALEX 715 is a polyoxyalkylene alkyl ether (a compound of general formula (1) in which R represents a lauryl group, m=15 and n=0) manufactured by Nihon Emulsion Co., Ltd.

(1-4) Production Examples for Pretreatment Liquids 2 to 81

With the exception of using the materials shown in Table 1, pretreatment liquids 2 to 81 were produced using the same method as the pretreatment liquid 1.

TABLE 1

| | | Example Number | 1 | 2 | 3 | 4 | 5 | 6 | 7 | 8 | 9 | 10 |
|---|---|---|---|---|---|---|---|---|---|---|---|---|
| | | Pretreatment Liquid Number | 1 | 2 | 3 | 4 | 5 | 6 | 7 | 8 | 9 | 10 |
| Binder resin | Resin microparticles (A) | SUPERCHLON E-480T | | | | 16.67 | | | | | | |
| | | AUROREN AE-301 | | | | | 16.67 | | | | | |
| | | ARROWBASE SB-1230N | | | | | | 20.00 | | | | |
| | | ARROWBASE SB-1200 | | | | | | | 20.00 | | | |
| | | HITEC S9200 | | | | | | | | 25.00 | | |
| | | HITEC E8237 | | | | | | | | | 12.50 | |
| | | HITEC E6400 | | | | | | | | | | 14.29 |
| | | HITEC E6500 | | | | | | | | | | |
| | | AQUACER 498 | | | | | | | | | | |
| | | Hordamer PE03 | | | | | | | | | | |
| | | Joncryl 7100 | 10.42 | | | | | | | | | |
| | | SUPERFLEX 470 | | 13.16 | | | | | | | | |
| | | PESRESIN A-684G | | | 25.00 | | | | | | | |
| Surfactant (B) | Polyoxyalkylene alkyl ether (b-1) | EMALEX 715 | 0.13 | 0.13 | 0.13 | 0.13 | 0.13 | 0.13 | 0.13 | 0.13 | 0.13 | 0.13 |
| Coagulant (C) | Polyvalent metal salt | Aluminum nitrate | 5.0 | 5.0 | 5.0 | 5.0 | 5.0 | 5.0 | 5.0 | 5.0 | 5.0 | 5.0 |
| | Cationic polymer compound | PAA-HCL-3L | | | | | | | | | | |
| | | PAA-U7030 | | | | | | | | | | |
| | | PAS-M-1 | | | | | | | | | | |
| | | PAS-H-1L | | | | | | | | | | |
| | | Catiomaster PE-30 | | | | | | | | | | |
| | | Catiomaster PD-7 | | | | | | | | | | |
| Organic solvent | | EtOH | 5.0 | 5.0 | 5.0 | 5.0 | 5.0 | 5.0 | 5.0 | 5.0 | 5.0 | 5.0 |
| Ion-exchanged water | | | 79.45 | 76.71 | 64.87 | 73.20 | 73.20 | 69.87 | 69.87 | 64.87 | 77.37 | 75.58 |
| Blend amount of polyoxyalkylene alkyl ether (b-1) relative to blend amount of resin microparticles (A) | | | 2.6% | 2.6% | 2.6% | 2.6% | 2.6% | 2.6% | 2.6% | 2.6% | 2.6% | 2.6% |

TABLE 1-continued

| Example Number | | | 11 | 12 | 13 | 14 | 15 | 16 | 17 | 18 | 19 |
|---|---|---|---|---|---|---|---|---|---|---|---|
| | Pretreatment Liquid Number | | 11 | 12 | 13 | 14 | 15 | 16 | 17 | 18 | 19 |
| Binder resin | Resin microparticles (A) | SUPERCHLON E-480T | | | | | | | | | |
| | | AUROREN AE-301 | | | | | | | | | |
| | | ARROWBASE SB-1230N | | | | | | | | | |
| | | ARROWBASE SB-1200 | | | | | | | | | |
| | | HITEC S9200 | | | | | | | | | |
| | | HITEC E8237 | | | | | | | | | |
| | | HITEC E6400 | | | | 14.29 | 14.29 | 14.29 | 14.29 | 14.29 | 14.29 |
| | | HITEC E6500 | 14.29 | | | | | | | | |
| | | AQUACER 498 | | 10.00 | | | | | | | |
| | | Hordamer PE03 | | | 12.50 | | | | | | |
| | | Joncryl 7100 | | | | | | | | | |
| | | SUPERFLEX 470 | | | | | | | | | |
| | | PESRESIN A-684G | | | | | | | | | |
| Surfactant (B) | Polyoxyalkylene alkyl ether (b-1) | EMALEX 715 | 0.13 | 0.13 | 0.13 | 0.13 | 0.13 | 0.13 | 0.13 | 0.13 | 0.13 |
| Coagulant (C) | Polyvalent metal salt | Aluminum nitrate | 5.0 | 5.0 | 5.0 | | | | | | |
| | Cationic polymer compound | PAA-HCL-3L | | | | 10.0 | | | | | |
| | | PAA-U7030 | | | | | 33.3 | | | | |
| | | PAS-M-1 | | | | | | 10.0 | | | |
| | | PAS-H-1L | | | | | | | 17.9 | | |
| | | Catiomaster PE-30 | | | | | | | | 10.0 | |
| | | Catiomaster PD-7 | | | | | | | | | 10.0 |
| Organic solvent | | EtOH | 5.0 | 5.0 | 5.0 | 5.0 | 5.0 | 5.0 | 5.0 | 5.0 | 5.0 |
| Ion-exchanged water | | | 75.58 | 79.87 | 77.37 | 70.58 | 47.25 | 70.58 | 62.72 | 70.58 | 70.58 |
| Blend amount of polyoxyalkylene alkyl ether (b-1) relative to blend amount of resin microparticles (A) | | | 2.6% | 2.6% | 2.6% | 2.6% | 2.6% | 2.6% | 2.6% | 2.6% | 2.6% |

| Example Number | | | 20 | 21 | 22 | 23 | 24 | 25 | 26 | 27 | 28 |
|---|---|---|---|---|---|---|---|---|---|---|---|
| | Pretreatment Liquid Number | | 20 | 21 | 22 | 23 | 24 | 25 | 26 | 27 | 28 |
| Binder resin | Resin microparticles (A) | AUROREN AE-301 | 16.67 | 16.67 | 16.67 | 16.67 | 16.67 | 16.67 | 16.67 | 16.67 | 16.67 |
| Surfactant (B) | Polyoxyalkylene alkyl ether (b-1) | Newcol 1008 | 0.13 | | | | | | | | |
| | | EMULGEN 1108 | | 0.13 | | | | | | | |
| | | EMULGEN 1118-70 | | | 0.18 | | | | | | |
| | | EMULGEN 1135-70 | | | | 0.18 | | | | | |
| | | EMULGEN 1150S-60 | | | | | 0.21 | | | | |
| | | NONION K-209 | | | | | | 0.13 | | | |
| | | EMALEX 730 | | | | | | | 0.13 | | |
| | | EMALEX 750 | | | | | | | | 0.13 | |
| | | NONION K-2100W | | | | | | | | | 0.13 |
| | | NONION P-210 | | | | | | | | | |
| | | NONION P-240 | | | | | | | | | |
| | | NONION S-215 | | | | | | | | | |
| | | EMALEX 630 | | | | | | | | | |
| | | EMALEX 640 | | | | | | | | | |
| | | EMALEX BHA-20 | | | | | | | | | |
| | | EMALEX BHA-30 | | | | | | | | | |
| | | NONION B-250 | | | | | | | | | |
| Coagulant (C) | Polyvalent metal salt | Aluminum nitrate | 5.0 | 5.0 | 5.0 | 5.0 | 5.0 | 5.0 | 5.0 | 5.0 | 5.0 |

TABLE 1-continued

| | | | | | | | | | | |
|---|---|---|---|---|---|---|---|---|---|---|
| Organic solvent | EtOH | 5.0 | 5.0 | 5.0 | 5.0 | 5.0 | 5.0 | 5.0 | 5.0 | 5.0 |
| Ion-exchanged water | | 73.20 | 73.20 | 73.15 | 73.15 | 73.12 | 73.20 | 73.20 | 73.20 | 73.20 |
| Blend amount of polyoxyalkylene alkyl ether (b-1) relative to blend amount of resin microparticles (A) | | 2.6% | 2.6% | 2.5% | 2.5% | 2.5% | 2.6% | 2.6% | 2.6% | 2.6% |

| | | Example Number | 29 | 30 | 31 | 32 | 33 | 34 | 35 | 36 |
|---|---|---|---|---|---|---|---|---|---|---|
| | | Pretreatment Liquid Number | 29 | 30 | 31 | 32 | 33 | 34 | 35 | 36 |
| Binder resin | Resin microparticles (A) | AUROREN AE-301 | 16.67 | 16.67 | 16.67 | 16.67 | 16.67 | 16.67 | 16.67 | 16.67 |
| Surfactant (B) | Polyoxyalkylene alkyl ether (b-1) | Newcol 1008 | | | | | | | | |
| | | EMULGEN 1108 | | | | | | | | |
| | | EMULGEN 1118-70 | | | | | | | | |
| | | EMULGEN 1135-70 | | | | | | | | |
| | | EMULGEN 1150S-60 | | | | | | | | |
| | | NONION K-209 | | | | | | | | |
| | | EMALEX 730 | | | | | | | | |
| | | EMALEX 750 | | | | | | | | |
| | | NONION K-2100W | | | | | | | | |
| | | NONION P-210 | 0.13 | | | | | | | |
| | | NONION P-240 | | 0.13 | | | | | | |
| | | NONION S-215 | | | 0.13 | | | | | |
| | | EMALEX 630 | | | | 0.13 | | | | |
| | | EMALEX 640 | | | | | 0.13 | | | |
| | | EMALEX BHA-20 | | | | | | 0.13 | | |
| | | EMALEX BHA-30 | | | | | | | 0.13 | |
| | | NONION B-250 | | | | | | | | 0.13 |
| Coagulant (C) | Polyvalent metal salt | Aluminum nitrate | 5.0 | 5.0 | 5.0 | 5.0 | 5.0 | 5.0 | 5.0 | 5.0 |
| Organic solvent | | EtOH | 5.0 | 5.0 | 5.0 | 5.0 | 5.0 | 5.0 | 5.0 | 5.0 |
| Ion-exchanged water | | | 73.20 | 73.20 | 73.20 | 73.20 | 73.20 | 73.20 | 73.20 | 73.20 |
| Blend amount of polyoxyalkylene alkyl ether (b-1) relative to blend amount of resin microparticles (A) | | | 2.6% | 2.6% | 2.6% | 2.6% | 2.6% | 2.6% | 2.6% | 2.6% |

| | | Example Number | 37 | 38 | 39 | 40 | 41 | 42 | 43 | 44 | 45 | 46 |
|---|---|---|---|---|---|---|---|---|---|---|---|---|
| | | Pretreatment Liquid Number | 37 | 38 | 39 | 40 | 41 | 42 | 43 | 44 | 45 | 46 |
| Binder resin | Resin microparticles (A) | AUROREN AE-301 | 16.67 | 16.67 | 16.67 | 16.67 | 16.67 | 16.67 | 16.67 | 16.67 | 16.67 | 16.67 |
| Surfactant (B) | Polyoxyalkylene alkyl ether (b-1) | EMULGEN 1118-70 | | | | | | | | | | |
| | | EMULGEN 1150S-60 | | | | | | | | | 0.08 | 0.42 |
| | | NONION S-215 | | | | | | 0.25 | 1.25 | 1.75 | 3.50 | |
| | | NONION E-215 | 0.13 | | | | | | | | | |
| | | EMALEX 820 | | 0.13 | | | | | | | | |
| | | UNISAFE 10P-8 | | | 0.13 | | | | | | | |
| | | UNISAFE 34S-23 | | | | 0.13 | | | | | | |
| Coagulant (C) | Polyvalent metal salt | Calcium lactate | | | | | | | | | | |
| | | Calcium ascorbate | | | | | | | | | | |
| | | Calcium acetate | | | | | | | | | | |
| | | Magnesium acetate | | | | | | | | | | |
| | | Aluminum sulfate | | | | | | | | | | |
| | | Aluminum nitrate | 5.0 | 5.0 | 5.0 | 5.0 | 5.0 | 5.0 | 5.0 | 5.0 | 5.0 | 5.0 |

TABLE 1-continued

| | | | | | | | | | | | |
|---|---|---|---|---|---|---|---|---|---|---|---|
| Organic solvent | EtOH | 5.0 | 5.0 | 5.0 | 5.0 | 5.0 | 5.0 | 5.0 | 5.0 | 5.0 | 5.0 |
| Ion-exchanged water | | 73.21 | 73.21 | 73.21 | 73.21 | 73.08 | 72.08 | 71.58 | 69.83 | 73.25 | 72.91 |
| Blend amount of polyoxyalkylene alkyl ether (b-1) relative to blend amount of resin microparticles (A) | | 2.5% | 2.5% | 2.5% | 2.5% | 5.0% | 25.0% | 35.0% | 70.0% | 1.0% | 5.0% |

| | | Example Number | 47 | 48 | 49 | 50 | 51 | 52 | 53 | 54 | 55 |
|---|---|---|---|---|---|---|---|---|---|---|---|
| | | Pretreatment Liquid Number | 47 | 48 | 49 | 50 | 51 | 52 | 53 | 54 | 55 |
| Binder resin | Resin microparticles (A) | AUROREN AE-301 | 16.67 | 16.67 | 16.67 | 16.67 | 16.67 | 16.67 | 16.67 | 16.67 | 16.67 |
| Surfactant (B) | Polyoxyalkylene alkyl ether (b-1) | EMULGEN 1118-70 | | | | 1.43 | 1.43 | 1.43 | 1.43 | 1.43 | 1.43 |
| | | EMULGEN 1150S-60 | 2.92 | 4.17 | 7.50 | | | | | | |
| | | NONION S-215 | | | | | | | | | |
| | | NONION E-215 | | | | | | | | | |
| | | EMALEX 820 | | | | | | | | | |
| | | UNISAFE 10P-8 | | | | | | | | | |
| | | UNISAFE 34S-23 | | | | | | | | | |
| Coagulant (C) | Polyvalent metal salt | Calcium lactate | | | | | 5.0 | | | | |
| | | Calcium ascorbate | | | | | | 5.0 | | | |
| | | Calcium acetate | | | | | | | 5.0 | | |
| | | Magnesium acetate | | | | | | | | 5.0 | |
| | | Aluminum sulfate | | | | | | | | | 5.0 |
| | | Aluminum nitrate | 5.0 | 5.0 | 5.0 | | | | | | 5.0 |
| Organic solvent | | EtOH | 5.0 | 5.0 | 5.0 | 5.0 | 5.0 | 5.0 | 5.0 | 5.0 | 5.0 |
| Ion-exchanged water | | | 70.41 | 69.16 | 65.83 | 71.90 | 71.90 | 71.90 | 71.90 | 71.90 | 71.90 |
| Blend amount of polyoxyalkylene alkyl ether (b-1) relative to blend amount of resin microparticles (A) | | | 35.0% | 50.0% | 90.0% | 20.0% | 20.0% | 20.0% | 20.0% | 20.0% | 20.0% |

| | | Example Number | 56 | 57 | 58 | 59 | 60 | 61 | 62 |
|---|---|---|---|---|---|---|---|---|---|
| | | Pretreatment Liquid Number | 56 | 57 | 58 | 59 | 60 | 61 | 62 |
| Binder resin | Resin microparticles (A) | AUROREN AE-301 | 16.67 | 16.67 | 16.67 | 16.67 | 16.67 | 16.67 | 16.67 |
| | | HITEC S9200 | | | | | | | |
| | | HITEC E6500 | | | | | | | 2.86 |
| | | SUPERFLEX 470 | | | | | | | |
| Surfactant (B) | Polyoxyalkylene alkyl ether (b-1) | EMULGEN 1108 | | | | | | | |
| | | EMULGEN 1118-70 | 1.43 | 1.43 | 1.43 | 1.43 | 1.43 | 1.43 | |
| | | EMULGEN 1150S-60 | | | | | | | 1.00 |
| | Polyoxyalkylene alkyl ether other than (b-1) | NONION K-204 | | | | 0.05 | | | |
| | Other surfactant | Surfynol 465 | | | | | 1.00 | | |
| | | KF-6015 | | | | | | 1.00 | |
| Coagulant (C) | Polyvalent metal salt | Calcium acetate | 5.0 | 5.0 | 5.0 | 5.0 | 5.0 | 5.0 | 5.0 |
| Organic solvent | | 2PrOH | 5.0 | | | 5.0 | 5.0 | 5.0 | 5.0 |
| | | 1,3-BGmME | | 5.0 | | | | | |
| | | 1,2-BD | | | 5.0 | | | | |
| Other materials | | Titanium oxide dispersion | | | | | | | |
| Ion-exchanged water | | | 71.90 | 71.90 | 71.90 | 71.85 | 70.90 | 70.90 | 69.47 |
| Blend amount of polyoxyalkylene alkyl ether (b-1) relative to blend amount of resin microparticles (A) | | | 20.0% | 20.0% | 20.0% | 20.0% | 20.0% | 20.0% | 10.0% |

TABLE 1-continued

| | | Example Number | 63 | 64 | 65 | 66 | 67 |
|---|---|---|---|---|---|---|---|
| | | Pretreatment Liquid Number | 63 | 64 | 65 | 66 | 67 |
| Binder resin | Resin microparticles (A) | AUROREN AE-301 | 16.67 | | | | |
| | | HITEC S9200 | | 25.00 | 25.00 | | 25.00 |
| | | HITEC E6500 | 2.86 | 5.71 | 2.86 | 5.71 | 2.86 |
| | | SUPERFLEX 470 | | | | 13.16 | |
| Surfactant (B) | Polyoxyalkylene alkyl ether (b-1) | EMULGEN 1108 | 0.30 | | | | |
| | | EMULGEN 1118-70 | | | | | |
| | | EMULGEN 1150S-60 | 1.00 | 1.17 | 1.00 | 1.17 | 1.00 |
| | Polyoxyalkylene alkyl ether other than (b-1) | NONION K-204 | | | | | |
| | Other surfactant | Surfynol 465 | | | | | |
| | | KF-6015 | | | | | |
| Coagulant (C) | Polyvalent metal salt | Calcium acetate | 5.0 | 5.0 | 5.0 | 5.0 | 5.0 |
| Organic solvent | | 2PrOH | 5.0 | 5.0 | 5.0 | 5.0 | 5.0 |
| | | 1,3-BGmME | | | | | |
| | | 1,2-BD | | | | | |
| Other materials | | Titanium oxide dispersion | | | | 20.0 | 20.0 |
| Ion-exchanged water | | | 69.17 | 58.12 | 61.14 | 49.96 | 41.14 |
| Blend amount of polyoxyalkylene alkyl ether (b-1) relative to blend amount of resin microparticles (A) | | | 15.0% | 10.0% | 10.0% | 10.0% | 10.0% |

| | | Comparative Example Number | 1 | 2 | 3 | 4 | 5 | 6 | 7 | 8 |
|---|---|---|---|---|---|---|---|---|---|---|
| | | Pretreatment Liquid Number | 68 | 69 | 70 | 71 | 72 | 73 | 74 | 75 |
| Binder resin | Resin microparticles (A) | AUROREN AE-301 | | | | | | | | |
| | | HITEC E6400 | | | 14.29 | 14.29 | 14.29 | 14.29 | 14.29 | 14.29 |
| | Water-soluble resin | PVA103 varnish | 20.00 | | | | | | | |
| Surfactant (B) | Polyoxyalkylene alkyl ether (b-1) | EMULGEN 1118-70 | | | | | | | | |
| | | EMULGEN 1150S-60 | 0.21 | 0.21 | | | | | | |
| | | EMALEX 715 | | | | | | | | |
| | Polyoxyalkylene alkyl ether other than (b-1) | Butyl triglycol H | | | 0.13 | | | | | |
| | | NONION K-204 | | | | 0.13 | | | | |
| | | UNILUBE MS-70K | | | | | 0.13 | | | |
| | | NONION A-25B | | | | | | 0.13 | | |
| | Other surfactant | RHEODOL TW-L120 | | | | | | | 0.13 | |
| | | Surfynol 465 | | | | | | | | |
| | | KF-6015 | | | | | | | | 0.13 |
| Coagulant (C) | Polyvalent metal salt | Calcium chloride | | | | | | | | |
| | | Aluminum nitrate | 5.0 | 5.0 | 5.0 | 5.0 | 5.0 | 5.0 | 5.0 | 5.0 |
| | Cationic polymer compound | PAS-H-10L | | | | | | | | |
| | Other coagulant | Malonic acid | | | | | | | | |
| Organic solvent | | EtOH | 5.0 | 5.0 | 5.0 | 5.0 | 5.0 | 5.0 | 5.0 | 5.0 |
| Ion-exchanged water | | | 69.79 | 89.79 | 75.58 | 75.58 | 75.58 | 75.58 | 75.58 | 75.58 |
| Blend amount of polyoxyalkylene alkyl ether (b-1) relative to blend amount of resin microparticles (A) | | | — | — | 0.0% | 0.0% | 0.0% | 0.0% | 0.0% | 0.0% |

TABLE 1-continued

| Comparative Example Number | | | | 9 | 10 | 11 | 12 | 13 | 14 |
|---|---|---|---|---|---|---|---|---|---|
| | Pretreatment Liquid Number | | | 76 | 77 | 78 | 79 | 80 | 81 |
| Binder resin | Resin microparticles (A) | | AUROREN AE-301 | | | 16.67 | 16.67 | 16.67 | |
| | | | HITEC E6400 | 14.29 | 14.29 | | | | 14.29 |
| | Water-soluble resin | | PVA103 varnish | | | | | | |
| Surfactant (B) | Polyoxyalkylene alkyl ether (b-1) | | EMULGEN 1118-70 | | | | 1.43 | 1.43 | 1.43 |
| | | | EMULGEN 1150S-60 | | | | | | |
| | | | EMALEX 715 | | | | | | 0.13 |
| | Polyoxyalkylene alkyl ether other than (b-1) | | Butyl triglycol H | | | | | | |
| | | | NONION K-204 | | | | | | |
| | | | UNILUBE MS-70K | | | | | | |
| | | | NONION A-25B | | | | | | |
| | Other surfactant | | RHEODOL TW-L120 | | | | | | |
| | | | Surfynol 465 | | | | | | |
| | | | KF-6015 | 0.13 | | | | | |
| Coagulant (C) | Polyvalent metal salt | | Calcium chloride | | | | 5.0 | | |
| | | | Aluminum nitrate | 5.0 | 5.0 | | | | |
| | Cationic polymer compound | | PAS-H-10L | | | | | | 17.9 |
| | Other coagulant | | Malonic acid | | | | | 5.0 | |
| Organic solvent | | | EtOH | 5.0 | 5.0 | 5.0 | 5.0 | 5.0 | 5.0 |
| Ion-exchanged water | | | | 75.58 | 75.71 | 71.90 | 71.90 | 76.90 | 62.68 |
| Blend amount of polyoxyalkylene alkyl ether (b-1) relative to blend amount of resin microparticles (A) | | | | 0.0% | 0.0% | 20.0% | 20.0% | 20.0% | 2.6% |

Details of the materials shown in Table 1 are as shown below in Table 2 and Table 3. The melting point and glass transition temperature values in Table 2 were measured by differential scanning calorimetry using a DSC-60 Plus manufactured by Shimadzu Corporation. Further, the particle size distribution values represent values measured by the dynamic light scattering method using a Microtrac UPA-EX150 manufactured by MicrotracBEL Corporation.

TABLE 2

| | | Name | Solid fraction | Details | | |
|---|---|---|---|---|---|---|
| Binder resin | Resin microparticles (A) | SUPERCHLON E-480T | 30% | Polyolefin resin microparticles (chlorinated) manufactured by Nippon Paper Industries Co., Ltd. | melting point: 70° C. | D50: 75 nm |
| | | AUROREN AE-301 | 30% | Polyolefin resin microparticles (unchlorinated) manufactured by Nippon Paper Industries Co., Ltd. | melting point: 70° C. | D50: 75 nm |
| | | ARROWBASE SB-1230N | 25% | Polyolefin resin microparticles (unchlorinated) manufactured by Unitika, Ltd. | melting point 75° C. | D50 85 nm |
| | | ARROWBASE SB-1200 | 25% | Polyolefin resin microparticles (unchlorinated) manufactured by Unitika, Ltd. | melting point 80° C. | D50: 110 nm |
| | | HITEC S9200 | 20% | Polyolefin resin microparticles (unchlorinated) manufactured by Toho Chemical Industry Co., Ltd. | melting point 90° C. | D50: 40 nm |
| | | HITEC E8237 | 40% | Polyolefin resin microparticles (unchlorinated) manufactured by Toho Chemical Industry Co., Ltd. | melting point 106° C. | D50: 80 nm |
| | | HITEC E6400 | 35% | Polyolefin resin microparticles (unchlorinated) manufactured by Toho Chemical Industry Co., Ltd. | melting point 120° C. | D50: 40 nm |

TABLE 2-continued

| | | Name | Solid fraction | Details | | |
|---|---|---|---|---|---|---|
| | | HITEC E6500 | 35% | Polyolefin resin microparticles (unchlorinated) manufactured by Toho Chemical Industry Co., Ltd. | melting point 140° C. | D50: 60 nm |
| | | AQUACER 498 | 50% | Paraffin resin microparticles manufactured by BYK-Chemie GmbH | melting point 60° C. | D50: 300 nm |
| | | Hordamer PE03 | 40% | Polyethylene resin microparticles manufactured by BYK-Chemie GmbH | melting point 95° C. | D50: 170 nm |
| | | Joncryl 7100 | 48% | Styrene-acrylic resin microparticles manufactured by BASF Corporation | Glass transition temperature: −10° C. | D50: 100 nm |
| | | SUPERFLEX 470 | 38% | Polyurethane resin microparticles manufactured by DKS Co., Ltd. | melting point: 95° C. glass transition temperature: −30° C. | D50: 50 nm |
| | | PESRESIN A-684G | 20% | Polyester resin microparticles manufactured by Takamatsu Oil & Fat Co., Ltd. | Glass transition temperature: 50° C. | D50: 60 nm |
| Coagulant (C) | Polyvalent metal salt | Calcium lactate | — | — | Water absorptivity: A | |
| | | Calcium ascorbate | — | — | Water absorptivity: A | |
| | | Calcium acetate | — | — | Water absorptivity: A | |
| | | Magnesium acetate | — | — | Water absorptivity: B | |
| | | Calcium chloride | — | — | Water absorptivity: C | |
| | | Aluminum sulfate | — | — | Water absorptivity: A | |
| | | Aluminum nitrate | — | — | Water absorptivity: B | |
| | Cationic polymer compound | PAA-HCL-3L | 50% | Polyallylamine hydrochloride manufactured by Nittobo Medical Co., Ltd. | Water absorptivity: B | Mw: 15,000 |
| | | PAA-U7030 | 15% | Partially methoxycarbonylated polyallylamine manufactured by Nittobo Medical Co., Ltd. | Water absorptivity: A | Mw: 15,000 |
| | | PAS-M-1 | 50% | Polymethyldiallylamine hydrochloride manufactured by Nittobo Medical Co., Ltd. | Water absorptivity: B | Mw: 20,000 |
| | | PAS-H-1L | 28% | Polydimethyldiallylammonium hydrochloride manufactured by Nittobo Medical Co., Ltd. | Water absorptivity: B | Mw: 8,500 |
| | | PAS-H-10L | 28% | Polydimethyldiallylammonium hydrochloride manufactured by Nittobo Medical Co., Ltd. | Water absorptivity: C | Mw: 200,000 |
| | | Catiomaster PE-30 | 50% | Polyepichlorohydrin manufactured by Yokkaichi Chemical Co., Ltd. | Water absorptivity: B | Mw: 9,000 |
| | | Catiomaster PD-7 | 50% | Polyepichlorohydrin manufactured by Yokkaichi Chemical Co., Ltd. | Water absorptivity: B | Mw: 5,000 |
| | Other surfactant | Malonic acid | — | — | Water absorptivity: B | |
| Organic solvent | | EtOH | — | Ethanol | Boiling point at 1 atmosphere: 78° C. | |
| | | 2PrOH | — | 2-propanol | Boiling point at 1 atmosphere: 83° C. | |
| | | 1,3-BGmME | — | 1,3-butylene glycol monomethyl ether (3-methoxybutanol) | Boiling point at 1 atmosphere: 158° C. | |
| | | 1,2-BD | — | 1,2-butanediol | Boiling point at 1 atmosphere: 192° C. | |

TABLE 3

| | | Name | Solid fraction | Details | |
|---|---|---|---|---|---|
| Surfactant (B) | Polyoxy-alkylene alkyl ether (b-1) | Newcol 1008 | 100% | Polyoxyalkylene alkyl ether manufactured by Nippon Nyukazai Co., Ltd., a compound of general formula (1) in which R = ethylhexyl group, m = 8, n = 0 | HLB = 14.6 |
| | | EMULGEN 1108 | 100% | Polyoxyalkylene alkyl ether manufactured by Kao Corporation, a compound of general formula (1) in which R = undecanyl group, m = 8, n = 0 | HLB = 13.4 |
| | | EMULGEN 1118-70 | 70% | Polyoxyalkylene alkyl ether manufactured by Kao Corporation, a compound of general formula (1) in which R = undecanyl group, m = 18, n = 0 | HLB = 16.4 |
| | | EMULGEN 1135-70 | 70% | Polyoxyalkylene alkyl ether manufactured by Kao Corporation, a compound of general formula (1) in which R = undecanyl group, m = 35, n = 0 | HLB = 18.0 |
| | | EMULGEN 1150S-60 | 60% | Polyoxyalkylene alkyl ether manufactured by Kao Corporation, a compound of general formula (1) in which R = undecanyl group, m = 50, n = 0 | HLB = 18.5 |
| | | NONION K-209 | 100% | Polyoxyalkylene alkyl ether manufactured by NOF Corporation, a compound of general formula (1) in which R = lauryl group, m = 9, n = 0 | HLB = 13.6 |
| | | EMALEX 715 | 100% | Polyoxyalkylene alkyl ether manufactured by Nihon Emulsion Co., Ltd., a compound of general formula (1) in which R = lauryl group, m = 15, n = 0 | HLB = 15.6 |
| | | EMALEX 730 | 100% | Polyoxyalkylene alkyl ether manufactured by Nihon Emulsion Co., Ltd., a compound of general formula (1) in which R = lauryl group, m = 30, n = 0 | HLB = 17.5 |
| | | EMALEX 750 | 100% | Polyoxyalkylene alkyl ether manufactured by Nihon Emulsion Co., Ltd., a compound of general formula (1) in which R = lauryl group, m = 50, n = 0 | HLB = 18.4 |
| | | NONION K-2100W | 100% | Polyoxyalkylene alkyl ether manufactured by NOF Corporation, a compound of general formula (1) in which R = lauryl group, m = 100, n = 0 | HLB = 19.2 |
| | | NONION P-210 | 100% | Polyoxyalkylene alkyl ether manufactured by NOF Corporation, a compound of general formula (1) in which R = octadecyl group, m = 10, n = 0 | HLB = 12.9 |
| | | NONION P-240 | 100% | Polyoxyalkylene alkyl ether manufactured by NOF Corporation, a compound of general formula (1) in which R = octadecyl group, m = 40, n = 0 | HLB = 17.6 |
| | | NONION S-215 | 100% | Polyoxyalkylene alkyl ether manufactured by NOF Corporation, a compound of general formula (1) in which R = stearyl group, m = 15, n = 0 | HLB = 14.2 |
| | | EMALEX 630 | 100% | Polyoxyalkylene alkyl ether manufactured by Nihon Emulsion Co., Ltd., a compound of general formula (1) in which R = stearyl group, m = 30, n = 0 | HLB = 16.6 |
| | | EMALEX 640 | 100% | Polyoxyalkylene alkyl ether manufactured by Nihon Emulsion Co., Ltd., a compound of general formula (1) in which R = stearyl group, m = 40, n = 0 | HLB = 17.3 |
| | | EMALEX BHA-20 | 100% | Polyoxyalkylene alkyl ether manufactured by Nihon Emulsion Co., Ltd., a compound of general formula (1) in which R = behenyl group, m = 20, n = 0 | HLB = 14.6 |
| | | EMALEX BHA-30 | 100% | Polyoxyalkylene alkyl ether manufactured by Nihon Emulsion Co., Ltd., a compound of general formula (1) in which R = behenyl group, m = 30, n = 0 | HLB = 16.0 |
| | | NONION B-250 | 100% | Polyoxyalkylene alkyl ether manufactured by NOF Corporation, a compound of general formula (1) in which R = behenyl group, m = 50, n = 0 | HLB = 17.4 |
| | | NONION E-215 | 100% | Polyoxyalkylene alkyl ether manufactured by NOF Corporation, a compound of general formula (1) in which R = oleyl group, m = 15, n = 0 | HLB = 14.2 |
| | | EMALEX 820 | 100% | Polyoxyalkylene alkyl ether manufactured by Nihon Emulsion Co., Ltd., a compound of general formula (1) in which R = heptadecylcarbonyl group, m = 20, n = 0 | HLB = 15.1 |
| | | UNISAFE 10P-8 | 100% | Polyoxyalkylene alkyl ether manufactured by NOF Corporation, a compound of general formula (1) in which R = octadecyl group, m = 10, n = 8 | HLB = 7.7 |
| | | UNISAFE 34S-23 | 100% | Polyoxyalkylene alkyl ether manufactured by NOF Corporation, a compound of general formula (1) in which R = stearyl group, m = 34, n = 23 | HLB = 9.7 |
| | Polyoxy-alkylene alkyl ether other than (b-1) | Butyl triglycol H | 100% | Polyoxyalkylene alkyl ether manufactured by Nippon Nyukazai Co., Ltd., a compound of general formula (1) in which R = butyl group, m = 4, n = 0 | HLB = 14.1 |
| | | NONION K-204 | 100% | Polyoxyalkylene alkyl ether manufactured by NOF Corporation, a compound of general formula (1) in which R = lauryl group, m = 4, n = 0 | HLB = 9.7 |
| | | UNILUBE MS-70K | 100% | Polyoxyalkylene alkyl ether manufactured by NOF Corporation, a compound of general formula (1) in which R = stearyl group, m = 0, n = 15 | HLB = 0.0 |

TABLE 3-continued

| | Name | Solid fraction | Details | |
|---|---|---|---|---|
| | NONION A-25B | 100% | Polyoxyalkylene alkyl ether manufactured by NOF Corporation, a compound of general formula (1) in which R = lauryl group, m = 25, n = 25 | HLB = 8.0 |
| Other surfactant | RHEODOL TW-L120 | 100% | Polyoxyethylene sorbitan monolaurate manufactured by Kao Corporation | HLB = 16.7 |
| | Surfynol 465 | 100% | Polyethoxylate of 2,4,7,9-tetramethyl-5-decyn-4,7-diol manufactured by Nissin Chemical Industry Co., Ltd. | HLB = 13.2 |
| | KF-6015 | 100% | A siloxane-based surfactant (polyether-modified) Manufactured by Shin-Etsu Chemical Co., Ltd. | HLB = 4.5 |

<Measurement of Water Absorption Mass Increase for Coagulant (C)>

In Table 2, the water absorption mass increase (water absorptivity) for each of the materials used as the coagulant (C) was evaluated against the following criteria. Here, the water absorption mass increase means the mass increase in the coagulant (C) upon storage for 24 hours in an environment at 40° C. and 80% RH, and is measured using the method described above.

A: the water absorption mass increase was 40% by mass or less

B: the water absorption mass increase was greater than 40% by mass but not more than 75% by mass C: the water absorption mass increase was greater than 75% by mass 2. Production of Aqueous Inkjet Inks (2-1) Production Example for Pigment Dispersing Resin 1

A reaction container fitted with a gas inlet tube, a thermometer, a condenser and a stirrer was charged with 95 parts of butanol, and the container was flushed with nitrogen gas. The inside of the container was heated to 110° C., and a mixture containing 35 parts of styrene, 40 parts of acrylic acid and 25 parts of behenyl methacrylate as polymerizable monomers and 6 parts of a polymerization initiator V-601 (manufactured by Wako Pure Chemical Industries, Ltd.) was added dropwise to the container over a period of two hours to achieve a polymerization reaction. Following completion of the dropwise addition, reaction was continued at 110° C. for a further three hours, an additional 0.6 parts of V-601 (manufactured by Wako Pure Chemical Industries, Ltd.) was then added, and the reaction was continued at 110° C. for a further one hour, thus obtaining a solution of a pigment dispersing resin 1. Following cooling of the solution to room temperature, dimethylaminoethanol was added to completely neutralize the solution, and 100 parts of water was then added to generate an aqueous solution. Subsequently, the aqueous solution was heated to at least 100° C., and by removing the butanol by azeotropic distillation with water so as to adjust the solid fraction to 30%, an aqueous solution (solid fraction: 30%) of the pigment dispersing resin 1 was obtained. The "aqueous solution" mentioned above describes a solution containing an aqueous medium, and components dispersed and/or dissolved in the aqueous medium. The acid value of the pigment dispersing resin 1, measured using the method described above, was 250 mgKOH/g, and the weight average molecular weight was 13,000.

(2-2) Production Examples for Aqueous Solutions of Pigment Dispersing Resins 2 to 6

With the exception of altering the types and amounts of the polymerizable monomers as shown below in Table 4, aqueous solutions (solid fraction: 30%) of pigment dispersing resins 2 to 6 were obtained in the same manner as the above pigment dispersing resin 1.

(2-3) Production Examples for Methyl Ethyl Ketone Solutions of Pigment Dispersing Resins 7 and 8

A reaction container fitted with a gas inlet tube, a thermometer, a condenser and a stirrer was charged with 95 parts of methyl ethyl ketone, and the container was flushed with nitrogen gas. The inside of the container was heated to 80° C., and a mixture containing 70 parts of styrene, 5 parts of acrylic acid, 10 parts of methyl methacrylate and 15 parts of polypropylene glycol methacrylate (BLEMMER PP-500 manufactured by NOF Corporation) as polymerizable monomers and 3.5 parts of a polymerization initiator V-65 (manufactured by Wako Pure Chemical Industries, Ltd.) was added dropwise to the container over a period of three hours to achieve a polymerization reaction. Following completion of the dropwise addition, reaction was continued at 80° C. for a further one hour, an additional 0.7 parts of V-65 (manufactured by Wako Pure Chemical Industries, Ltd.) was then added, and the reaction was continued at 80° C. for a further four hours, thus obtaining a solution of a pigment dispersing resin 7. Subsequently, 25 parts of methyl ethyl ketone was added, and following cooling of the reaction system to normal temperature, the mixed solution was removed from the reaction container, and the solid fraction was adjusted to 30% using methyl ethyl ketone, thus obtaining a methyl ethyl ketone solution (solid fraction: 30%) of the pigment dispersing resin 7. The acid value of the pigment dispersing resin 7, measured using the method described above, was 30 mgKOH/g, and the weight average molecular weight was 25,500.

Further, with the exception of altering the types and amounts of the polymerizable monomers as shown below in Table 4, a methyl ethyl ketone solution (solid fraction: 30%) of a pigment dispersing resin 8 was obtained in the same manner as the pigment dispersing resin 7.

TABLE 4

| | | Pigment dispersing resin | | | | | | | |
| | | Water-soluble pigment dispersing resins | | | | | | Water-insoluble resins | |
| | | 1 | 2 | 3 | 4 | 5 | 6 | 7 | 8 |
|---|---|---|---|---|---|---|---|---|---|
| Polymerizable monomers | Styrene | 35 | 10 | 20 | 60 | 40 | 20 | 70 | 45 |
| | Acrylic acid | 40 | 30 | 30 | 30 | 40 | 80 | 5 | 5 |
| | Methyl methacrylate | | 10 | | | | | 10 | 20 |
| | Lauryl methacrylate | | 50 | 50 | 10 | | | | |
| | Behenyl methacrylate | 25 | | | | | | | 30 |
| | PE-350 | | | | | 20 | | | |
| | PP-500 | | | | | | | 15 | |
| Acid value | | 250 | 180 | 170 | 180 | 230 | 480 | 30 | 30 |
| Weight average molecular weight | | 13,000 | 14,500 | 15,000 | 11,500 | 14,000 | 7,500 | 25,500 | 35,000 |

In Table 4, "PE-350" represents BLEMMER PE-350 (a polyethylene glycol methacrylate) manufactured by NOF Corporation, and "PP-500" represents BLEMMER PP-500 (a polypropylene glycol methacrylate) manufactured by NOF Corporation.

(2-4) Production Examples for Pigment Dispersions 1C, 1M, 1Y and 1K

Twenty parts of LIONOL BLUE 7358G (C.I. Pigment Blue 15:3) manufactured by Toyo Color Co., Ltd., 20 parts of the aqueous solution (solid fraction: 30%) of the pigment dispersing resin 1 and 60 parts of water were mixed together and premixed using a stirrer, and the mixture was then subjected to a main dispersion using a Dyno-Mill with a capacity of 0.6 L filled with 1,800 g of zirconia beads of diameter 0.5 mm, thus obtaining a pigment dispersion 1C. Further, with the exception of replacing the C.I. Pigment Blue 15:3 with each of the pigments shown below, pigment dispersions 1M, 1Y and 1K were obtained in the same manner as the pigment dispersion 1C.

Magenta: FASTOGEN SUPER MAGENTA RG (C.I. Pigment Red 122), manufactured by DIC Corporation Yellow: LIONOL YELLOW TT-1405G (C.I. Pigment Yellow 14), manufactured by Toyo Color Co., Ltd.

Black: PrinteX 85 (carbon black), manufactured by Orion Engineered Carbons S.A.

(2-5) Production Examples for Pigment Dispersions 2 to 6 (C, M, Y, K)

With the exception of using the aqueous solutions (solid fraction: 30%) of each of the pigment dispersing resins 2 to 6 as the pigment dispersing resin, pigment dispersions 2 to 6 (each including C, M, Y and K) were obtained using the same method as that described for the pigment dispersions 1C, 1M, 1Y and 1K.

(2-6) Production Examples for Pigment Dispersions 7C, 7M, 7Y and 7K)

A mixing container fitted with a stirrer was charged with 33.3 parts of the methyl ethyl ketone solution (solid fraction: 30.3%) of the pigment dispersing resin 7, 50 parts of water and 0.45 parts of dimethylaminoethanol were added under stirring, and the mixture was then stirred for a further 30 minutes. Subsequently, 20 parts of LIONOL BLUE 7358G (C.I. Pigment Blue 15:3) manufactured by Toyo Color Co., Ltd. was added, and following thorough stirring (premixing), a Dyno-Mill with a capacity of 0.6 L filled with 1,800 g of zirconia beads of diameter 1 mm was used to perform the main dispersion. The thus obtained dispersion was then removed from the Dyno-Mill, 15 parts of water was added, and an evaporator was used to remove the methyl ethyl ketone by distillation under reduced pressure. Subsequently, water was used to adjust the pigment concentration to 20%, thus obtaining a pigment dispersion 7C. Further, with the exception of replacing the C.I. Pigment Blue 15:3 with each of the pigments used in the production of the pigment dispersions 1M, 1Y and 1K, pigment dispersions 7M, 7Y and 7K were obtained in the same manner as the pigment dispersion 7C.

(2-7) Production Examples for Pigment Dispersions 8C, 8M, 8Y and 8K)

With the exception of using the methyl ethyl ketone solution (solid fraction: 30%) of the pigment dispersing resin 8 as the pigment dispersing resin, the same method as that described for the pigment dispersions 7C, 7M, 7Y and 7K was used to obtain pigment dispersions 8C, 8M, 8Y and 8K.

(2-8) Production Example for Pigment Dispersion 1W

Forty parts of TIPAQUE CR-90-2 (titanium oxide) manufactured by Ishihara Sangyo Kaisha, Ltd., 20 parts of the aqueous solution (solid fraction: 30%) of the pigment dispersing resin 1, and 40 parts of water were mixed, and following premixing using a stirrer, a Dyno-Mill with a capacity of 0.6 L filled with 1,800 g of zirconia beads of diameter 1 mm was used to perform the main dispersion, thus obtaining a pigment dispersion 1W (pigment concentration: 40%).

(2-9) Production Example for Aqueous Inkjet Ink Set 1 (CMYK)

The materials listed below were added sequentially to a mixing container fitted with a stirrer, and thorough stirring was performed until a uniform mixture was obtained. Subsequently, a filtration was performed using a membrane filter having a pore size of 1 μm to remove coarse particles that can cause inkjet head blockages, thus obtaining an aqueous inkjet cyan ink 1. Further, with the exception of using each of the pigment dispersions 1M, 1Y and 1K instead of the pigment dispersion 1C, an aqueous inkjet ink set 1 composed of the four colors of cyan (C), magenta (M), yellow (Y) and black (K) was obtained.

| | |
|---|---|
| Pigment dispersion 1C | 25 parts |
| Joncryl 8211 (solid fraction: 44%) | 10 parts |
| 1,2-butanediol | 20 parts |
| KF-6015 | 1 part |
| PROXEL GXL | 0.05 parts |
| Ion-exchanged water | 43.95 parts |

In the above production example, Joncryl 8211 is an acrylic resin emulsion (solid fraction: 44%) manufactured by BASF Corporation.

(2-10) Production Examples for Inkjet Ink Sets 2 to 27 (CMYK)

With the exception of using the materials shown below in Table 5, the same method as that described for the inkjet ink set 1 was used to obtain inkjet ink sets 2 to 27, each composed of the four colors of cyan (C), magenta (M), yellow (Y) and black (K).

TABLE 5

| | | | CMYK Inkjet Ink Set | | | | | | | |
|---|---|---|---|---|---|---|---|---|---|---|
| | | | 1 | 2 | 3 | 4 | 5 | 6 | 7 | 8 |
| Pigment dispersion | Pigment dispersion 1 (C, M, Y, K) | | 25 | | | | | | | |
| | Pigment dispersion 2 (C, M, Y, K) | | | 25 | | | | | | |
| | Pigment dispersion 3 (C, M, Y, K) | | | | 25 | | | | | |
| | Pigment dispersion 4 (C, M, Y, K) | | | | | 25 | | | | |
| | Pigment dispersion 5 (C, M, Y, K) | | | | | | 25 | | | |
| | Pigment dispersion 6 (C, M, Y, K) | | | | | | | 25 | | |
| | Pigment dispersion 7 (C, M, Y, K) | | | | | | | | 25 | |
| | Pigment dispersion 8 (C, M, Y, K) | | | | | | | | | 25 |
| Pigment Self-dispersion | Cabojet | | | | | | | | | |
| Binder resin | Joncryl 8211 | | 10 | 10 | 10 | 10 | 10 | 10 | 10 | 10 |
| Water-soluble organic solvent | 1,2-BD | 192 | 20 | 20 | 20 | 20 | 20 | 20 | 20 | 20 |
| | TEGmEE | 256 | | | | | | | | |
| Surfactant | KF-6015 | | 1 | 1 | 1 | 1 | 1 | 1 | 1 | 1 |
| Preservative | PROXEL GXL | | 0.05 | 0.05 | 0.05 | 0.05 | 0.05 | 0.05 | 0.05 | 0.05 |
| Ion-exchanged water | | | 43.95 | 43.95 | 43.95 | 43.95 | 43.95 | 43.95 | 43.95 | 43.95 |
| Parameters | Water-soluble organic solvent weighted boiling point average value at 1 atmosphere | | 192.0 | 192.0 | 192.0 | 192.0 | 192.0 | 192.0 | 192.0 | 192.0 |
| | Amount of solvent having boiling point at 1 atmosphere of 250° C. or higher | | 0 | 0 | 0 | 0 | 0 | 0 | 0 | 0 |
| | Amount of solvent having boiling point at 1 atmosphere of 220° C. or higher | | 0 | 0 | 0 | 0 | 0 | 0 | 0 | 0 |

TABLE 5-continued

| | | | CMYK Inkjet Ink Set | | | | |
|---|---|---|---|---|---|---|---|
| | | | 9 | 10 | 11 | 12 | 13 |
| Pigment dispersion | Pigment dispersion 1 (C, M, Y, K) | | | 25 | 25 | 25 | 25 |
| | Pigment dispersion 2 (C, M, Y, K) | | | | | | |
| | Pigment dispersion 3 (C, M, Y, K) | | | | | | |
| | Pigment dispersion 4 (C, M, Y, K) | | | | | | |
| | Pigment dispersion 5 (C, M, Y, K) | | | | | | |
| | Pigment dispersion 6 (C, M, Y, K) | | | | | | |
| | Pigment dispersion 7 (C, M, Y, K) | | | | | | |
| | Pigment dispersion 8 (C, M, Y, K) | | | | | | |
| Pigment Self-dispersion | Cabojet | | C, M, Y: 50 K: 25 | | | | |
| Binder resin | Joncryl 8211 | | 10 | 10 | 10 | 10 | 10 |
| Water-soluble organic solvent | 1,2-BD | 192 | 20 | 10 | 15 | 18 | 19 |
| | TEGmEE | 256 | | 10 | 5 | 2 | 1 |
| Surfactant | KF-6015 | | 1 | 1 | 1 | 1 | 1 |
| Preservative | PROXEL GXL | | 0.05 | 0.05 | 0.05 | 0.05 | 0.05 |
| Ion-exchanged water | | | C, M, Y: 18.95 K: 43.95 | 43.95 | 43.95 | 43.95 | 43.95 |
| Parameters | Water-soluble organic solvent weighted boiling point average value at 1 atmosphere | | 192.0 | 224.0 | 208.0 | 198.4 | 195.2 |
| | Amount of solvent having boiling point at 1 atmosphere of 250° C. or higher | | 0 | 10 | 5 | 2 | 1 |
| | Amount of solvent having boiling point at 1 atmosphere of 220° C. or higher | | 0 | 10 | 5 | 2 | 1 |

| | | | CMYK Inkjet Ink Set | | | | | | | |
|---|---|---|---|---|---|---|---|---|---|---|
| | | | 14 | 15 | 16 | 17 | 18 | 19 | 20 | 21 |
| Pigment dispersion | Pigment dispersion 1 (C, M, Y, K) | | 25 | 25 | 25 | 25 | 25 | 25 | 25 | 25 |
| Binder resin | Joncryl 8211 | | 10 | 10 | 10 | 10 | 10 | 10 | 10 | 10 |
| Water-soluble organic solvent | PGmME | 120 | | | | | | | | |
| | 1,3-BGmME | 158 | | | | | | | | |
| | 1,2-PD | 188 | | | | | | | | |
| | 1,2-BD | 192 | 15 | 18 | 15 | 18 | 3 | 6 | 30 | 40 |
| | 1,3-PD | 214 | | | | | | | | |
| | 1,2-HD | 224 | 5 | 2 | 3 | 1 | | | | |
| | TEGmEE | 256 | | | 2 | 1 | | | | |
| Surfactant | Surfynol 465 | | | | | | | | | |
| | KF-6015 | | 1 | 1 | 1 | 1 | 1 | 1 | 1 | 1 |

TABLE 5-continued

| | | | | | | | | | |
|---|---|---|---|---|---|---|---|---|---|
| Preservative | PROXEL GXL | 0.05 | 0.05 | 0.05 | 0.05 | 0.05 | 0.05 | 0.05 | 0.05 |
| Ion-exchanged | water | 43.95 | 43.95 | 43.95 | 43.95 | 60.95 | 57.95 | 33.95 | 23.95 |
| Parameters | Water-soluble organic solvent weighted boiling point average value at 1 atmosphere | 200.0 | 195.2 | 203.2 | 196.8 | 192.0 | 192.0 | 192.0 | 192.0 |
| | Amount of solvent having boiling point at 1 atmosphere of 250° C. or higher | 0 | 0 | 2 | 1 | 0 | 0 | 0 | 0 |
| | Amount of solvent having boiling point at 1 atmosphere of 220° C. or higher | 5 | 2 | 5 | 2 | 0 | 0 | 0 | 0 |

| | | | CMYK Inkjet Ink Set | | | | | |
|---|---|---|---|---|---|---|---|---|
| | | | 22 | 23 | 24 | 25 | 26 | 27 |
| Pigment dispersion | Pigment dispersion 1 (C, M, Y, K) | | 25 | 25 | 25 | 25 | 25 | 25 |
| Binder resin | Joncryl 8211 | | 10 | 10 | 10 | 10 | 10 | 10 |
| Water-soluble organic solvent | PGmME | 120 | | | | 5 | | |
| | 1,3-BGmME | 158 | | | 15 | 10 | 5 | |
| | 1,2-PD | 188 | | 20 | 5 | | | |
| | 1,2-BD | 192 | | | | 5 | 15 | 20 |
| | 1,3-PD | 214 | 20 | | | | | |
| | 1,2-HD | 224 | | | | | | |
| | TEGmEE | 256 | | | | | | |
| Surfactant | Surfynol 465 | | | | | | | 1.5 |
| | KF-6015 | | 1 | 1 | 1 | 1 | 1 | |
| Preservative | PROXEL GXL | | 0.05 | 0.05 | 0.05 | 0.05 | 0.05 | 0.05 |
| Ion-exchanged | water | | 43.95 | 43.95 | 43.95 | 43.95 | 43.95 | 43.45 |
| Parameters | Water-soluble organic solvent weighted boiling point average value at 1 atmosphere | | 214.0 | 188.0 | 165.5 | 157.0 | 183.5 | 192.0 |
| | Amount of solvent having boiling point at 1 atmosphere of 250° C. or higher | | 0 | 0 | 0 | 0 | 0 | 0 |
| | Amount of solvent having boiling point at 1 atmosphere of 220° C. or higher | | 0 | 0 | 0 | 0 | 0 | 0 |

In Table 5, the blend amount of the Cabojet listed below in the inkjet ink set 9 was 50% by mass for C, M and Y, and 25% by mass for K. The blend amount of ion-exchanged water was 18.95% by mass for C, M and Y, and 43.95% by mass for K. Further, of the materials shown in Table 4, abbreviations and details for those materials not included in Tables 1 to 3 are as follows.

Cabojet

Cyan: Cabojet 250C (a self-dispersing cyan pigment aqueous solution, manufactured by Cabot Corporation, pigment concentration: 10%)

Magenta: Cabojet 265M (a self-dispersing magenta pigment aqueous solution, manufactured by Cabot Corporation, pigment concentration: 10%)

Yellow: Cabojet 270 (a self-dispersing yellow pigment aqueous solution, manufactured by Cabot Corporation, pigment concentration: 10%)

Black: Cabojet 200 (a self-dispersing carbon black aqueous solution, manufactured by Cabot Corporation, pigment concentration: 10%)

PGmME: propylene glycol monomethyl ether (boiling point: 120° C.)

1,2-PD: 1,2-propanediol (boiling point: 188° C.)

1,3-PD: 1,3-propanediol (boiling point: 214° C.)

1,2-HD: 1,2-hexanediol (boiling point: 224° C.)

TEGmEE: triethylene glycol monoethyl ether (boiling point: 256° C.)

PROXEL GXL: 1,2-benzoisothiazol-3-one solution (preservative) manufactured by Arch Chemicals, Inc.

In Table 5 and the following Table 6, for the water-soluble organic solvent contained in each ink, the weighted boiling point average at one atmosphere (° C.), and the amount (% by mass) of water-soluble organic solvents having a boiling point at one atmosphere of 250° C. (or 220° C.) and higher are also shown in the table.

<(2-11) Production Examples for Aqueous Inkjet White Inks 1 to 11>

With the exception of using the materials shown below in Table 6, aqueous inkjet white inks 1 to 11 were obtained using the same method as that described for the inkjet cyan ink 1.

a conveyor capable of transporting a substrate, and was filled with one of the aqueous inkjet ink sets produced above in the order K, C, M, Y from the upstream side. Subsequently, the film substrate coated with the pretreatment liquid that had been prepared in the manner described above was secured to the conveyor, the conveyor was driven at a constant speed, and when the substrate passed beneath the installed position of the inkjet head, each of the inkjet inks was discharged using a drop volume of 10 pL, thereby printing the images described below. Immediately after printing, the printed item was placed in a 70° C. air oven and dried for 5 minutes to complete production of the printed item.

TABLE 6

|  |  |  | Aqueous Inkjet White Ink | | | | | | | | | | |
|---|---|---|---|---|---|---|---|---|---|---|---|---|---|
|  |  |  | 1 | 2 | 3 | 4 | 5 | 6 | 7 | 8 | 9 | 10 | 11 |
| Pigment dispersion | Pigment dispersion 1W |  | 25 | 25 | 25 | 25 | 25 | 25 | 25 | 25 | 25 | 25 | 25 |
| Binder resin | Joncryl 8211 |  | 10 | 10 | 10 | 10 | 10 | 10 | 10 | 10 | 10 | 10 | 10 |
| Water-soluble organic solvent | PGmME | 120 |  |  |  |  |  |  |  |  |  | 5 |  |
|  | 1,3-BGmME | 158 |  |  |  |  |  |  |  |  | 15 | 10 |  |
|  | 1,2-PD | 188 |  |  |  |  |  |  |  | 20 | 5 |  |  |
|  | 1,2-BD | 193 | 20 | 10 | 15 | 18 | 15 | 18 |  |  |  | 5 | 20 |
|  | 1,3-PD | 214 |  |  |  |  |  |  | 20 |  |  |  |  |
|  | 1,2-HD | 224 |  |  |  |  | 5 | 2 |  |  |  |  |  |
|  | TEGmEE | 256 |  | 10 | 5 | 2 |  |  |  |  |  |  |  |
| Surfactant | Surfynol 465 |  |  |  |  |  |  |  |  |  |  |  | 1 |
|  | KF-6015 |  | 1 | 1 | 1 | 1 | 1 | 1 | 1 | 1 | 1 | 1 |  |
| Preservative | PROXEL GXL |  | 0.05 | 0.05 | 0.05 | 0.05 | 0.05 | 0.05 | 0.05 | 0.05 | 0.05 | 0.05 | 0.05 |
| Ion-exchanged water |  |  | 43.95 | 43.95 | 43.95 | 43.95 | 43.95 | 43.95 | 43.95 | 43.95 | 43.95 | 43.95 | 43.95 |
| Parameters | Water-soluble organic solvent weighted boiling point average value at 1 atmosphere |  | 193.0 | 224.5 | 208.8 | 199.3 | 200.8 | 196.1 | 214.0 | 188.0 | 165.5 | 157.3 | 193.0 |
|  | Amount of solvent having boiling point at 1 atmosphere of 250° C. or higher |  | 0 | 10 | 5 | 2 | 0 | 0 | 0 | 0 | 0 | 0 | 0 |
|  | Amount of solvent having boiling point at 1 atmosphere of 220° C. or higher |  | 0 | 10 | 5 | 2 | 5 | 2 | 0 | 0 | 0 | 0 | 0 |

Examples 68 to 160, Comparative Examples 15 to 28

3. Production Examples for Film Substrates Coated with Pretreatment Liquid

Using a K Control Coater K202 manufactured by Matsuo Sangyo Co., Ltd. and a wire bar No. 0, each of the pretreatment liquids prepared above was applied to a film substrate described below with a wet film thickness of 4.0±0.2 μm, and the film substrate with the applied pretreatment liquid was then placed in a 70° C. air oven and dried for 3 minutes, thus producing a film substrate coated with the pretreatment liquid.

<Film Substrates Used for Evaluations>

OPP: a biaxially stretched polypropylene film "OPU-1" manufactured by Mitsui Chemicals Tohcello Inc. (thickness: 20 μm)

PET: a polyethylene terephthalate film "Lumirror T60" manufactured by Toray Industries, Inc. (thickness: 25 μm)

Production Examples for Printed Items

An inkjet head KJ4B-QA (manufactured by Kyocera Corporation, design resolution: 600 dpi) was installed above Printing was conducted with the conveyor drive speed set to one of two conditions, namely 30 m/minute or 50 m/minute. Three print images were prepared, an image in which 5 cm×5 cm solid patches are arranged adjacent to one another at a print ratio of 100% in the order CMYK (hereafter called the "solid patches image"), a 4-color (CMYK) image in which the total print ratio (the total of the print ratios for each of the colors) is varied continuously from 40 to 320% (hereafter called the "gradation image", wherein the print ratio is the same for each color at each total print ratio), and a solid image printed using CMYK at a total print ratio of 320% (hereafter called the "4C solid image", wherein the print ratio of each color is 80%), and printed items of each image were produced.

Using the combinations of pretreatment liquids and aqueous inkjet ink sets shown below in Table 8, the printed items described above were produced. Using these printed items, or the pretreatment liquid itself, the following evaluations 1 to 5 were performed. The results of the evaluations are as shown in Table 8.

<Evaluation 1: Evaluation of Image Quality>

The gradation image printed item, printed on the OPP film substrate under conveyor drive speed conditions of 30 m/minute or 50 m/minute in accordance with the method described above, was used. Evaluation of the image quality (bleeding, color mixing) was performed by inspecting the dot shape of the image printed item using an optical microscope at a magnification of 200×. The evaluation criteria are as shown below in Table 7, with 2 points or more being deemed a practically applicable level.

TABLE 7

| Evaluation points | Evaluation criteria | |
|---|---|---|
| | Printed item at 30 m/min | Printed item at 50 m/min |
| 6 | Dots were independent at all total print ratios, and no bleeding or color mixing was observed | Dots were independent at all total print ratios, and no bleeding or color mixing was observed |
| 5 | Dots were independent at all total print ratios, and no bleeding or color mixing was observed | Dots were independent in portions having total print ratios of 280% or less, and no bleeding or color mixing was observed |
| 4 | Dots were independent in portions having total print ratios of 280% or less, and no bleeding or color mixing was observed | Dots were independent in portions having total print ratios of 240% or less, and no bleeding or color mixing was observed |
| 3 | Dots were independent in portions having total print ratios of 240% or less, and no bleeding or color mixing was observed | Dots were independent in portions having total print ratios of 200% or less, and no bleeding or color mixing was observed |
| 2 | Dots were independent in portions having total print ratios of 200% or less, and no bleeding or color mixing was observed | Bleeding or color mixing was observed in portions having total print ratios of 200% or less |
| 1 | Bleeding or color mixing was observed in portions having total print ratios of 200% or less | Bleeding or color mixing was observed in portions having total print ratios of 200% or less |

<Evaluation 2: Evaluation of Adhesion>

The solid patches image printed item produced under conveyor drive speed conditions of 30 m/minute in accordance with the method described above was used. A cellophane tape manufactured by Nichiban Co., Ltd. (width: 18 mm) was adhered securely to the surface of the image printed item, and the tip of the cellophane tape was then grasped and peeled away from the printed item with the angle maintained at 90°. The adhesion was evaluated by visually inspecting the surface of the printed item and the cellophane tape following the peeling operation.

The evaluation criteria were as follows, with 2 points or more being deemed a practically applicable level. The adhesion was evaluated for both the printed item on the OPP film substrate and the printed item on the PET film substrate. The evaluation for the color that yielded the worst evaluation result among the 4 colors that were evaluated was recorded.

5: no peeling was observed from the cellophane-adhered surface

4: the peeled surface area was less than 10% of the cellophane-adhered surface

3: the peeled surface area was at least 10% but less than 20% of the cellophane-adhered surface 2: the peeled surface area was at least 20% but less than 30% of the cellophane-adhered surface 1: the peeled surface area was at least 30% of the cellophane-adhered surface <Evaluation 3: Evaluation of Drying Properties>

Using the same procedure as that described for the above printed item production examples, a solid patches image was printed onto an OPP film coated with a pretreatment liquid under conveyor drive speed conditions of 30 m/minute. Immediately after printing, the printed item was placed in a 70° C. air oven, and after each one minute, the printed item was removed from the air oven, and the drying properties were evaluated by rubbing the surface with a finger and visually evaluating the state of the printed item.

The evaluation criteria were as follows, with 2 points or more being deemed a practically applicable level.

4: one minute after placing in the air oven, the printed item had dried, and no ink adhered to the finger upon rubbing 3: ink adhered to the finger one minute after placing in the air oven, but no ink adhesion occurred after two minutes 2: ink adhered to the finger two minutes after placing in the air oven, but no ink adhesion occurred after three minutes 1: ink adhered to the finger from the printed item even after three minutes in the air oven <Evaluation 4: Evaluation of Blocking Resistance>

The 4C solid image printed item on the OPP film substrate produced under conveyor drive speed conditions of 30 m/minute in accordance with the method described above was used. The image printed item was cut into a 4 cm×4 cm square and overlaid on the rear surface of an OPP film similar to that used in the printed item, and a blocking test was then performed using a permanent strain tester. The environmental conditions during the blocking test included a load of 10 kg/cm$^2$, a temperature of 40° C., humidity of 80%, and a test period of 24 hours. After 24 hours had passed, the stacked OPP films were pulled apart instantaneously with the angle between the films maintained at 90°, and the blocking resistance was evaluated by visually inspecting the peeled printed surface.

The evaluation criteria were as follows, with 2 points or more being deemed a practically applicable level.

5: no peeling of the printed surface was observed

4: the peeled surface area was less than 5% of the printed surface

3: the peeled surface area was less at least 5% but less than 10% of the printed surface 2: the peeled surface area was less at least 10% but less than 10% of the printed surface 1: the peeled surface area was at least 15% of the printed surface <Evaluation 5: Evaluation of Storage Stability of Pretreatment Liquid>

For each of the pretreatment liquids produced above, the viscosity at 25° C. was measured using an E-type viscometer (TVE-20L manufactured by Toki Sangyo Co., Ltd.), and the pretreatment liquid was then placed in a sealed container and stored in a still state in a thermostatic chamber set to 70° C. After each one week, the sealed container was removed, the viscosity following storage was remeasured in the same manner as above, and the storage stability of the pretreatment liquid was evaluated by calculating the change in viscosity during storage.

The evaluation criteria were as follows, with 2 points or more being deemed a practically applicable level.

5: the change in viscosity after four weeks storage was less than ±5%

4: the change in viscosity after three weeks storage was less than ±5%, but the change in viscosity after four weeks storage was at least ±5%

3: the change in viscosity after two weeks storage was less than ±5%, but the change in viscosity after three weeks storage was at least ±5%

2: the change in viscosity after one week storage was less than ±5%, but the change in viscosity after two weeks storage was at least ±5%

1: the change in viscosity after one week storage was at least ±5%

TABLE 8

| | Pretreatment liquid | Inkjet ink set | Evaluation results | | | | | |
|---|---|---|---|---|---|---|---|---|
| | | | 1 Image quality | 2 Adhesion | | 3 Drying properties | 4 Blocking resistance | 5 Storage stability |
| | | | | OPP film | PET film | | | |
| Example 68 | 1 | 1 | 3 | 2 | 2 | 3 | 3 | 2 |
| Example 69 | 2 | 1 | 3 | 2 | 2 | 3 | 3 | 2 |
| Example 70 | 3 | 1 | 3 | 3 | 3 | 3 | 3 | 3 |
| Example 71 | 4 | 1 | 3 | 4 | 3 | 3 | 3 | 2 |
| Example 72 | 5 | 1 | 3 | 4 | 3 | 3 | 3 | 3 |
| Example 73 | 6 | 1 | 3 | 4 | 3 | 3 | 3 | 3 |
| Example 74 | 7 | 1 | 3 | 4 | 3 | 3 | 3 | 3 |
| Example 75 | 8 | 1 | 3 | 3 | 3 | 3 | 3 | 3 |
| Example 76 | 9 | 1 | 3 | 3 | 2 | 3 | 3 | 3 |
| Example 77 | 10 | 1 | 3 | 3 | 2 | 3 | 3 | 3 |
| Example 78 | 11 | 1 | 3 | 3 | 2 | 3 | 3 | 3 |
| Example 79 | 12 | 1 | 3 | 3 | 2 | 3 | 3 | 3 |
| Example 80 | 13 | 1 | 3 | 3 | 2 | 3 | 3 | 3 |
| Example 81 | 14 | 1 | 2 | 2 | 2 | 3 | 3 | 3 |
| Example 82 | 15 | 1 | 2 | 2 | 2 | 3 | 4 | 3 |
| Example 83 | 16 | 1 | 2 | 2 | 2 | 3 | 3 | 3 |
| Example 84 | 17 | 1 | 2 | 2 | 2 | 3 | 3 | 3 |
| Example 85 | 18 | 1 | 3 | 2 | 2 | 2 | 3 | 3 |
| Example 86 | 19 | 1 | 3 | 2 | 2 | 2 | 3 | 3 |
| Example 87 | 20 | 1 | 3 | 5 | 4 | 3 | 3 | 2 |
| Example 88 | 21 | 1 | 3 | 5 | 4 | 3 | 3 | 2 |
| Example 89 | 22 | 1 | 3 | 4 | 4 | 3 | 3 | 3 |
| Example 90 | 23 | 1 | 3 | 3 | 3 | 3 | 3 | 4 |
| Example 91 | 24 | 1 | 3 | 4 | 3 | 3 | 3 | 4 |
| Example 92 | 25 | 1 | 3 | 5 | 5 | 3 | 3 | 2 |
| Example 93 | 26 | 1 | 3 | 3 | 3 | 3 | 3 | 4 |
| Example 94 | 27 | 1 | 3 | 3 | 2 | 3 | 3 | 4 |
| Example 95 | 28 | 1 | 3 | 2 | 2 | 3 | 2 | 3 |
| Example 96 | 29 | 1 | 3 | 5 | 4 | 3 | 3 | 2 |
| Example 97 | 30 | 1 | 3 | 3 | 3 | 3 | 3 | 2 |
| Example 98 | 31 | 1 | 3 | 4 | 3 | 3 | 3 | 3 |
| Example 99 | 32 | 1 | 3 | 4 | 3 | 3 | 3 | 4 |
| Example 100 | 33 | 1 | 3 | 3 | 3 | 3 | 3 | 4 |
| Example 101 | 34 | 1 | 3 | 4 | 3 | 3 | 2 | 3 |
| Example 102 | 35 | 1 | 3 | 3 | 3 | 3 | 2 | 3 |
| Example 103 | 36 | 1 | 3 | 4 | 3 | 3 | 2 | 3 |
| Example 104 | 37 | 1 | 3 | 4 | 3 | 3 | 3 | 3 |
| Example 105 | 38 | 1 | 3 | 3 | 3 | 3 | 3 | 2 |
| Example 106 | 39 | 1 | 3 | 3 | 3 | 3 | 3 | 2 |
| Example 107 | 40 | 1 | 3 | 2 | 2 | 3 | 3 | 2 |
| Example 108 | 41 | 1 | 3 | 5 | 4 | 3 | 3 | 4 |
| Example 109 | 42 | 1 | 3 | 5 | 4 | 3 | 3 | 4 |
| Example 110 | 43 | 1 | 3 | 4 | 4 | 3 | 3 | 4 |
| Example 111 | 44 | 1 | 3 | 3 | 2 | 3 | 3 | 4 |
| Example 112 | 45 | 1 | 3 | 5 | 4 | 3 | 3 | 2 |
| Example 113 | 46 | 1 | 3 | 4 | 4 | 3 | 3 | 5 |
| Example 114 | 47 | 1 | 3 | 4 | 3 | 3 | 3 | 5 |
| Example 115 | 48 | 1 | 3 | 3 | 3 | 3 | 3 | 5 |
| Example 116 | 49 | 1 | 3 | 2 | 2 | 3 | 3 | 3 |
| Example 117 | 50 | 1 | 5 | 4 | 3 | 3 | 4 | 4 |
| Example 118 | 51 | 1 | 5 | 4 | 3 | 3 | 4 | 4 |
| Example 119 | 52 | 1 | 5 | 4 | 3 | 3 | 4 | 4 |
| Example 120 | 53 | 1 | 5 | 4 | 3 | 3 | 3 | 4 |
| Example 121 | 54 | 1 | 3 | 4 | 3 | 3 | 4 | 4 |
| Example 122 | 55 | 1 | 3 | 4 | 3 | 3 | 3 | 4 |
| Example 123 | 56 | 1 | 5 | 4 | 3 | 3 | 4 | 4 |
| Example 124 | 57 | 1 | 5 | 4 | 3 | 3 | 4 | 4 |
| Example 125 | 58 | 1 | 5 | 4 | 3 | 2 | 4 | 4 |
| Example 126 | 59 | 1 | 6 | 3 | 3 | 3 | 4 | 3 |
| Example 127 | 60 | 1 | 6 | 3 | 3 | 3 | 4 | 3 |

TABLE 8-continued

| | Pretreatment liquid | Inkjet ink set | Evaluation results | | | | | |
|---|---|---|---|---|---|---|---|---|
| | | | 1 Image quality | 2 Adhesion | | 3 Drying properties | 4 Blocking resistance | 5 Storage stability |
| | | | | OPP film | PET film | | | |
| Example 128 | 61 | 1 | 6 | 2 | 2 | 3 | 4 | 3 |
| Example 129 | 62 | 1 | 5 | 4 | 3 | 3 | 5 | 5 |
| Example 130 | 63 | 1 | 6 | 4 | 3 | 3 | 5 | 5 |
| Example 131 | 64 | 1 | 5 | 3 | 3 | 3 | 5 | 5 |
| Example 132 | 65 | 1 | 5 | 3 | 3 | 3 | 5 | 5 |
| Example 133 | 66 | 1 | 5 | 3 | 3 | 3 | 5 | 4 |
| Example 134 | 67 | 1 | 5 | 2 | 2 | 3 | 5 | 4 |
| Example 135 | 56 | 2 | 3 | 3 | 2 | 2 | 4 | omitted |
| Example 136 | 56 | 3 | 5 | 4 | 3 | 2 | 4 | |
| Example 137 | 56 | 4 | 5 | 4 | 3 | 2 | 3 | |
| Example 138 | 56 | 5 | 5 | 5 | 3 | 2 | 4 | |
| Example 139 | 56 | 6 | 5 | 4 | 3 | 2 | 3 | |
| Example 140 | 56 | 7 | 5 | 5 | 3 | 2 | 4 | |
| Example 141 | 56 | 8 | 5 | 4 | 3 | 3 | 4 | |
| Example 142 | 56 | 9 | 2 | 3 | 2 | 2 | 3 | |
| Example 143 | 56 | 10 | 2 | 4 | 3 | 2 | 4 | |
| Example 144 | 56 | 11 | 3 | 4 | 3 | 3 | 4 | |
| Example 145 | 56 | 12 | 4 | 4 | 3 | 3 | 4 | |
| Example 146 | 56 | 13 | 5 | 4 | 3 | 3 | 4 | |
| Example 147 | 56 | 14 | 4 | 4 | 3 | 3 | 4 | |
| Example 148 | 56 | 15 | 5 | 4 | 3 | 3 | 4 | |
| Example 149 | 56 | 16 | 4 | 4 | 3 | 3 | 4 | |
| Example 150 | 56 | 17 | 5 | 4 | 3 | 3 | 4 | |
| Example 151 | 56 | 18 | 3 | 4 | 2 | 4 | 4 | |
| Example 152 | 56 | 19 | 5 | 4 | 3 | 3 | 4 | |
| Example 153 | 56 | 20 | 5 | 4 | 3 | 3 | 4 | |
| Example 154 | 56 | 21 | 3 | 4 | 3 | 2 | 4 | |
| Example 155 | 56 | 22 | 3 | 4 | 3 | 2 | 4 | |
| Example 156 | 56 | 23 | 6 | 4 | 3 | 4 | 4 | |
| Example 157 | 56 | 24 | 6 | 4 | 3 | 4 | 4 | |
| Example 158 | 56 | 25 | 6 | 4 | 3 | 4 | 4 | |
| Example 159 | 56 | 26 | 6 | 4 | 3 | 4 | 4 | |
| Example 160 | 56 | 27 | 6 | 4 | 3 | 3 | 4 | |
| Comparative Example 15 | 68 | 1 | 3 | 1 | 2 | 3 | 1 | 3 |
| Comparative Example 16 | 69 | 1 | 4 | 1 | 1 | 2 | 1 | 4 |
| Comparative Example 17 | 70 | 1 | 1 | 2 | 1 | 3 | 2 | 1 |
| Comparative Example 18 | 71 | 1 | 2 | 2 | 2 | 3 | 3 | 1 |
| Comparative Example 19 | 72 | 1 | 2 | 2 | 1 | 3 | 3 | 1 |
| Comparative Example 20 | 73 | 1 | 2 | 2 | 2 | 3 | 3 | 1 |
| Comparative Example 21 | 74 | 1 | 1 | 2 | 1 | 3 | 2 | 1 |
| Comparative Example 22 | 75 | 1 | 2 | 2 | 2 | 3 | 3 | 1 |
| Comparative Example 23 | 76 | 1 | 2 | 2 | 2 | 3 | 3 | 1 |
| Comparative Example 24 | 77 | 1 | 1 | 2 | 1 | 3 | 2 | 1 |
| Comparative Example 25 | 78 | 1 | 4 | 1 | 1 | 1 | 1 | 3 |
| Comparative Example 26 | 79 | 1 | 2 | 1 | 1 | 1 | 1 | 3 |
| Comparative Example 27 | 80 | 1 | 1 | 5 | 5 | 3 | 5 | 4 |
| Comparative Example 28 | 81 | 1 | 2 | 1 | 1 | 1 | 1 | 3 |

In Table 8, the results for evaluation 5 (evaluation of the storage stability of the pretreatment liquid) for Examples 135 to 160 are omitted because the storage stability for the pretreatment liquid 56 had already been evaluated in Example 123.

Examples 161 to 174

Combinations of a pretreatment liquid, an aqueous inkjet black ink (the black-colored ink from an aqueous inkjet ink set) and an aqueous inkjet white ink shown below in Table 9 were evaluated for clarity and legibility using a method described below. The evaluation results were as shown in Table 9.

<Evaluation 6: Evaluation of Clarity and Legibility>

An inkjet head KJ4B-QA was installed above a conveyor capable of transporting a substrate, and was filled with the aqueous inkjet black ink (K ink) and the aqueous inkjet white ink (W ink) shown in Table 9, with the color shown in Table 9 installed at the upstream side. In Examples 106 and 107, a W ink was not used, and only a K ink was used. Subsequently, a film substrate coated with the pretreatment liquid shown in Table 9 was secured to the conveyor, the conveyor was driven at a speed of 30 m/minute, and when the substrate passed beneath the installed position of the inkjet head, each of the aqueous inkjet inks was discharged. During printing, the K ink was used to print a text-based image composed of a mixture of hiragana and kanji printed in the MS Mincho font at 4-point and 6-point sizes, whereas the W ink was used to print a white solid image at a print ratio of 100%. Further, the image of the ink provided at the downstream side was printed so as to overlap the image of the ink provided at the upstream side. Immediately after printing, the printed item was placed in a 70° C. air oven and dried for 5 minutes to complete production of the text and white solid printed item.

The thus obtained text and white solid printed item was inspected visually from the inspection surface recorded in Table 9, and the clarity and legibility was evaluated. The evaluation criteria were as follows, with 2 points or more being deemed a practically applicable level.

4: both the 4-point and 6-point text was clear and easily readable

3: the 4-point text exhibited slightly inferior clarity but was readable, whereas the 6-point text was clear and easily readable 2: the 4-point text exhibited poor clarity and was unreadable. The 6-point text exhibited slightly inferior clarity but was readable 1: both the 4-point and 6-point text exhibited poor clarity and was unreadable

TABLE 9

| | Pretreatment liquid | Inkjet black ink | Inkjet white ink | Evaluation 6 Clarity and legibility | | |
|---|---|---|---|---|---|---|
| | | | | Ink color at upstream side | Inspection surface | Evaluation result |
| Example 161 | 56 | 1 | 1 | black | rear | 3 |
| Example 162 | 56 | 10 | 2 | black | rear | 2 |
| Example 163 | 56 | 11 | 3 | black | rear | 2 |
| Example 164 | 56 | 12 | 4 | black | rear | 3 |
| Example 165 | 56 | 14 | 5 | black | rear | 3 |
| Example 166 | 56 | 15 | 6 | black | rear | 3 |
| Example 167 | 56 | 22 | 7 | black | rear | 2 |
| Example 168 | 56 | 23 | 8 | black | rear | 4 |
| Example 169 | 56 | 24 | 9 | black | rear | 4 |
| Example 170 | 56 | 25 | 10 | black | rear | 4 |
| Example 171 | 56 | 27 | 11 | black | rear | 4 |
| Example 172 | 56 | 1 | 1 | white | front | 3 |
| Example 173 | 66 | 1 | — | black (white ink not used) | front | 3 |
| Example 174 | 67 | 1 | — | black (white ink not used) | front | 3 |

In Table 9, those printed items for which the inspection surface is listed as "rear" describe printed items that were inspected from the film substrate side, whereas those listed as "front" describe printed items that were inspected from the printed layer side.

As shown in Table 8, in Examples 68 to 160, each of which used a pretreatment liquid containing resin microparticles (A), a polyoxyalkylene alkyl ether (b-1) represented by general formula (1), a coagulant (C) having a water absorptivity at a temperature of 40° C. and a relative humidity of 80% of 75% by mass or less, and water, the image quality, adhesion, drying properties and blocking resistance of the printed items, and the storage stability of the pretreatment liquid were all of practically applicable levels. Further, printed items produced using the pretreatment liquids of the compositions described above, an aqueous inkjet black ink and an aqueous inkjet white ink exhibited good clarity and legibility.

Among Examples 68 to 134, which used the inkjet ink set 1, the pretreatment liquids 50 to 52, 56 and 57, and 62 to 66, which were used in Examples 117 to 119, 123 and 124, and 129 to 133 respectively, exhibited image quality of 5 points or higher, and had scores of 3 points or higher for all of the other evaluations, confirming extremely favorable quality levels.

All of the above pretreatment liquids contained a polyolefin resin as the resin microparticles (A), contained a polyoxyalkylene alkyl ether (b-1) represented by general formula (1) in which R is an alkyl group of 10 to 18 carbon atoms, m is from 15 to 50, and m+n is from 15 to 55 as the surfactant (B), contained a calcium salt as the coagulant (C), and also contained a water-soluble organic solvent having at least one hydroxyl group with a boiling point at one atmosphere of 75 to 180° C. As a result, it can be stated that a pretreatment liquid of this this type of composition is extremely useful in achieving the objects of the present invention.

On the other hand, Comparative Examples 15 and 16 were systems that did not contain the resin microparticles (A), and the results for the adhesion and blocking resistance of the printed items were poor. Further, Comparative Examples 17 to 24 were systems that did not contain the polyoxyalkylene alkyl ether (b-1) represented by general formula (1), and each of these pretreatment liquids exhibited poor storage stability. Comparative Examples 17, 21 and 24 also suffered from poor image quality and adhesion for the printed items, and these results suggest that the polyoxyalkylene alkyl ether (b-1) represented by general formula (1) not only improves the storage stability, but also contributes to preventing any deterioration in the image quality and adhesion of the printed items.

Furthermore, Comparative Examples 25 and 28 were systems that contained a polyvalent metal salt or a cationic polymer compound having a water absorptivity greater than 75% by mass as a coagulant. Comparative Example 26 was a system that contained an organic acid as a coagulant. In each of these comparative examples, the results for the adhesion, drying properties and blocking resistance of the printed items were inferior. Moreover, the pretreatment liquid 80 used in Comparative Example 27 was a system that did not contain a coagulant, and the image quality was markedly inferior.

The results described above indicate that a pretreatment liquid having the composition described in the present invention is able to provide a combination of favorable image quality, adhesion, drying properties and blocking resistance for printed items formed on impermeable substrates such as film substrates, as well as favorable storage stability for the pretreatment liquid.

The invention claimed is:

1. An ink set comprising:
a pretreatment liquid comprising resin microparticles (A), a surfactant (B), a coagulant (C) and water; and
an aqueous inkjet ink comprising a pigment, a water-soluble organic solvent and water,
wherein the surfactant (B) comprises a polyoxyalkylene alkyl ether (b-1) represented by a general formula (1) shown below,
the coagulant (C) comprises a polyvalent metal salt and/or a cationic polymer compound, and
the coagulant (C) has a water absorptivity at a relative humidity of 80% of 75% by mass or less:

$$R\text{—}O\text{-}(EO)_m\text{-}(PO)_n\text{—}H \qquad \text{General formula (1)}$$

wherein R represents an alkyl group of 8 to 22 carbon atoms, an alkenyl group of 8 to 22 carbon atoms, an alkylcarbonyl group of 8 to 22 carbon atoms, or an alkenylcarbonyl group of 8 to 22 carbon atoms,
EO represents an ethylene oxide group and PO represents a propylene oxide group,
m represents an average number of added moles of EO and is a number from 8 to 100,
n represents an average number of added moles of PO, and is a number from 0 to 99, provided that m>n, and
when n is not 0, there are no restrictions on an addition sequence of $(EO)_m$ and $(PO)_n$, and the addition may be in blocks or may be random.

2. The ink set according to claim 1, wherein a blend amount of the polyoxyalkylene alkyl ether (b-1) is from 5 to 50% by mass relative to a blend amount of the resin microparticles (A).

3. The ink set according to claim 1, wherein the coagulant (C) comprises a divalent metal salt.

4. The ink set according to claim 1, wherein the resin microparticles (A) comprise two or more types of resin microparticles selected from the group consisting of polyurethane resins, polyurethane polyurea resins, (meth)acrylic resins, acrylic-modified polyurethane resins, and polyolefin resins.

5. The ink set according to claim 1, wherein the pretreatment liquid is used on a thermoplastic resin substrate.

* * * * *